United States Patent
Song et al.

(10) Patent No.: US 12,456,012 B2
(45) Date of Patent: *Oct. 28, 2025

(54) INFERENCE METHODS FOR WORD OR WORDPIECE TOKENIZATION

(71) Applicant: Google LLC, Mountain View, CA (US)

(72) Inventors: Xinying Song, Bellevue, WA (US);
Yang Song, Bellevue, WA (US)

(73) Assignee: Google LLC, Mountain View, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 18/205,609

(22) Filed: Jun. 5, 2023

(65) Prior Publication Data

US 2024/0054288 A1  Feb. 15, 2024

Related U.S. Application Data

(63) Continuation of application No. 17/798,638, filed as application No. PCT/US2020/033419 on May 18, 2020, now Pat. No. 11,763,083.

(51) Int. Cl.
*G06F 40/284* (2020.01)
*G06F 16/31* (2019.01)
(Continued)

(52) U.S. Cl.
CPC .......... *G06F 40/284* (2020.01); *G06F 16/322* (2019.01); *G06F 40/40* (2020.01)

(58) Field of Classification Search
CPC .... G06F 40/211; G06F 40/253; G06F 40/268; G06F 40/284; G06F 40/30; G06F 18/00
See application file for complete search history.

(56) References Cited

U.S. PATENT DOCUMENTS

| 5,627,748 A | 5/1997 | Baker et al. |
| 5,832,428 A | 11/1998 | Chow et al. |

(Continued)

FOREIGN PATENT DOCUMENTS

| CN | 105260354 A | 1/2016 |
| CN | 106528536 A | 3/2017 |

(Continued)

OTHER PUBLICATIONS

Notice of Allowance for Chinese Patent Application No. 202080098275.7, Jun. 2, 2023, 6 Pages.

(Continued)

*Primary Examiner* — Lamont M Spooner
(74) *Attorney, Agent, or Firm* — Botos Churchill IP Law

(57) ABSTRACT

Systems and methods for performing inference for word or wordpiece tokenization are disclosed using a left-to-right longest-match-first greedy process. In some examples, the vocabulary may be organized into a trie structure in which each node includes a precomputed token or token_ID and a fail link, so that the tokenizer can parse the trie in a single pass to generate a list of only those tokens or token_IDs that correspond to the longest matching vocabulary entries in the sample string, without the need for backtracking. In some examples, the vocabulary may be organized into a trie in which each node has a fail link, and any node that would share token(s) or token_ID(s) of a preceding node is instead given a prev_match link that points back to a chain of nodes with those token(s) or token_ID(s).

20 Claims, 13 Drawing Sheets

(51) Int. Cl.
  *G06F 40/30* (2020.01)
  *G06F 40/40* (2020.01)

(56) References Cited

U.S. PATENT DOCUMENTS

| | | | | |
|---|---|---|---|---|
| 6,263,333 | B1* | 7/2001 | Houchin | G06F 40/237 707/999.005 |
| 7,440,304 | B1* | 10/2008 | Raj | G11C 15/00 365/49.1 |
| 7,565,380 | B1* | 7/2009 | Venkatachary | G06F 16/90344 707/999.102 |
| 7,610,269 | B1* | 10/2009 | Gupta | G06F 16/00 |
| 7,636,717 | B1* | 12/2009 | Gupta | G06F 16/90344 |
| 7,805,393 | B1* | 9/2010 | Venkatachary | G06N 5/02 706/48 |
| 9,336,192 | B1* | 5/2016 | Barba | G06F 40/284 |
| 9,514,246 | B2* | 12/2016 | Billa | G06F 16/245 |
| 10,241,998 | B1* | 3/2019 | Zhang | G06F 40/126 |
| 2003/0149562 | A1 | 8/2003 | Walther | |
| 2003/0187633 | A1 | 10/2003 | Fairweather | |
| 2005/0055200 | A1 | 3/2005 | Park | |
| 2006/0004744 | A1 | 1/2006 | Nevidomski et al. | |
| 2006/0106773 | A1* | 5/2006 | Chang | G06F 16/90344 |
| 2006/0293880 | A1 | 12/2006 | Elshishiny et al. | |
| 2007/0015119 | A1* | 1/2007 | Atenasio | G09B 25/06 434/130 |
| 2007/0192863 | A1* | 8/2007 | Kapoor | H04L 67/63 726/23 |
| 2007/0282835 | A1* | 12/2007 | Duxbury | G06F 16/9024 |
| 2008/0071757 | A1* | 3/2008 | Ichiriu | G06F 16/951 |
| 2008/0071765 | A1* | 3/2008 | Ichiriu | G06F 16/90344 707/999.005 |
| 2008/0071779 | A1* | 3/2008 | Mammen | G06F 16/24568 |
| 2008/0071780 | A1* | 3/2008 | Ichiriu | G06F 16/90344 |
| 2008/0071781 | A1* | 3/2008 | Ninan | G06F 16/90344 |
| 2008/0111716 | A1* | 5/2008 | Artan | G06F 21/564 341/50 |
| 2008/0133583 | A1* | 6/2008 | Artan | G06F 21/564 707/999.102 |
| 2008/0229415 | A1* | 9/2008 | Kapoor | H04L 63/14 726/22 |
| 2008/0262990 | A1* | 10/2008 | Kapoor | H04L 67/306 706/20 |
| 2008/0262991 | A1* | 10/2008 | Kapoor | H04L 63/14 706/20 |
| 2010/0010989 | A1* | 1/2010 | Li | G06F 16/334 707/E17.017 |
| 2010/0229040 | A1* | 9/2010 | Chen | G06F 16/3331 714/E11.029 |
| 2011/0016142 | A1* | 1/2011 | Chen | G06F 16/90344 707/758 |
| 2011/0213869 | A1* | 9/2011 | Korsunsky | G06F 21/55 709/223 |
| 2011/0214157 | A1* | 9/2011 | Korsunsky | H04L 63/1458 726/1 |
| 2011/0231510 | A1* | 9/2011 | Korsunsky | G06F 21/55 709/213 |
| 2011/0231564 | A1* | 9/2011 | Korsunsky | H04L 63/1483 709/231 |
| 2011/0238855 | A1* | 9/2011 | Korsunsky | H04L 63/1441 709/231 |
| 2012/0166180 | A1* | 6/2012 | Au | G06F 40/237 704/9 |
| 2012/0240185 | A1* | 9/2012 | Kapoor | H04L 41/0866 726/1 |
| 2013/0124474 | A1 | 5/2013 | Anderson | |
| 2013/0159318 | A1* | 6/2013 | Xu | G06F 40/232 707/748 |
| 2016/0239748 | A1* | 8/2016 | Han | H04L 63/1416 |
| 2017/0255670 | A1 | 9/2017 | Lei | |
| 2017/0277811 | A1* | 9/2017 | Mistry | G06F 16/9027 |
| 2017/0278001 | A1* | 9/2017 | Mistry | G06F 16/90344 |
| 2017/0293612 | A1* | 10/2017 | Mistry | G06F 16/2452 |
| 2018/0046697 | A1* | 2/2018 | Maciolek | G06F 16/285 |
| 2018/0060302 | A1 | 3/2018 | Liang et al. | |
| 2018/0260469 | A1* | 9/2018 | Paris | H04L 9/0877 |
| 2019/0236178 | A1* | 8/2019 | Jagota | G06F 16/2246 |
| 2021/0232637 | A1* | 7/2021 | Jagota | G06F 16/902 |
| 2021/0319854 | A1* | 10/2021 | Pilato | G06F 40/284 |

FOREIGN PATENT DOCUMENTS

| | | | |
|---|---|---|---|
| CN | 108846016 | A | 11/2018 |
| KR | 20140094003 | A | 7/2014 |

OTHER PUBLICATIONS

Aho-Corasick algorithm, Wikipedia.com, printed from https://en.wikipedia.org/wiki/Aho-Corasick_algorithm on Aug. 9, 2022. 4 pages.

Chien-Chi Chen, et al., "A Multi-Character Transition String Matching Architecture Based on Aho-Corasick Algorithm," International Journal of Innovative Computing, Information and Control. vol. 8, No. 12, pp. 8367-8386. Dec. 2012.

D. Palmer. "Handbook of Natural Language Processing," Chapter 02, Tokenisation and Sentence Segmentation. 2006. 23 pages.

Daniel Jurafsky & James H. Martin. Speech and Language Processing. Chapter 2. Downloaded on Aug. 9, 2022 from https://web.stanford.edu/~jurafsky/slp3/2.pdf. Draft of Dec. 29, 2021. 30 Pages.

Hash table, Wikipedia.com, printed from https://en.wikipedia.org/wiki/Hash_table on Aug. 9, 2022. 15 pages.

International Search Report and Written Opinion for International Application No. PCT/US2020/033419 mailed Feb. 15, 2021, 7 pages.

Jianfeng Gao, et al. Chinese Word Segmentation and Named Entity Recognition: A Pragmatic Approach. Computational Linguistics, 31(4):531-574. 2005.

Julia Hockenmaier et al. Error-Driven Learning of Chinese Word Segmentation. In Proceedings of the 12th Pacific Asia Conference on Language, Information and Computation, pp. 218-229, Singapore. 1998.

Knuth-Morris-Pratt algorithm, Wikipedia.com, printed from https://en.wikipedia.org/wiki/Knuth-Morris-Pratt_algorithm on Aug. 9, 2022. 8 pages.

Kudo et al., title={Sentencepiece: A simple and language independent subword tokenizer and detokenizer for neural text processing}, 2018, journal={arXiv preprint arXiv: 1808.06226}, pp. 1-6. (Year: 2018).

Li et al., title={Incorporating knowledge into neural network for text representation}, 2018, journal={Expert Systems with Applications}, vol. 96, publisher={Elsevier}, pp. 103-114 (Year: 2018).

P.K. Wong. An Efficient Chinese Word Segmentation Algorithm for Chinese Information Processing on the Internet. In: Hui, L.C.K., Lee, DL. (eds) Internet Applications. ICSC 1999. Lecture Notes in Computer Science, vol. 1749. pp. 427-432. 1999.

Rico Sennrich, et al. Neural Machine Translation of Rare Words with Subword Units. In Proceedings of the 54th Annual Meeting of the Association for Computational Linguistics (vol. 1: Long Papers), pp. 1715-1725. 2016.

S. Arudchutha, et al., "String Matching with Multicore CPUs: Performing Better with the Aho-Corasick Algorithm," arXiv:1403.1305, Mar. 6, 2014, pp. 1-6.

The First Office Action for Chinese Patent Application No. 202080098275.7, Mar. 5, 2023.

Yue Zhao, et al. "A New Chinese Word Segmentation Method Based on Maximum Matching." J. Inf. Hiding Multim. Signal Process. 9 (2018): 1528-1535.

The Extended European Search Report for European Patent Application No. 20936795.2, Aug. 8, 2023, 101 Pages.

Aho, et al., "Efficient String Matching: An Aid to Bibliographic Search", Association for Computing Machinery, Inc. Copyright 1975, pp. 333-340.

(56) References Cited

OTHER PUBLICATIONS

Song, et al., "Linear-time Wordpiece Tokenizalion a Pre-print", arXiv:2012.15524v1, Dec. 31, 2020, 13 Pages.

* cited by examiner

INFERENCE METHODS FOR WORD OR WORDPIECE TOKENIZATION

CROSS-REFERENCE TO RELATED APPLICATIONS

This application is a continuation of U.S. application Ser. No. 17/798,638, filed Aug. 10, 2022, which was a national stage filing claiming the benefit of and priority to PCT/US20/33419, filed May 18, 2020, the entire disclosures of which are incorporated by reference herein.

BACKGROUND

Natural language processing ("NLP") techniques utilize various forms of tokenization to transform text into a collection of tokens. For example, a tokenizer may turn a given sample of text into a series of words by splitting the text at whitespace characters (e.g., spaces, paragraph markers) and punctuation characters, and may further process the words by removing accent markers and other nonstandard characters, and changing capital letters to lowercase letters. In some NLP techniques, such as Bidirectional Encoder Representations from Transformers ("BERT"), each word of the text may be broken down further into sub-word units, referred to herein as wordpieces. Likewise, in written languages in which words are not separated by spaces (e.g., Chinese), NLP techniques may use the same procedure to break a string of characters representing multiple words down into segments that each represent a single word. This process, referred to herein as word or wordpiece inference, may be performed by a tokenizer that uses a vocabulary of known words or wordpieces to recognize individual words or wordpieces within each string.

BRIEF SUMMARY

The present technology relates to systems and methods for performing word or wordpiece inference using a left-to-right longest-match-first greedy process (or "Forward Max-Match" process) in which each input string is broken down into the longest matching tokens moving from left to right (e.g., for an input string that is a single word, the longest matching prefix and suffix tokens). In that regard, and as discussed further below, in some aspects of the present technology, the tokenizer's vocabulary may be organized into a trie structure in which each node includes a precomputed token or token_ID as well as a fail link, so that the tokenizer can parse the trie in a single pass to generate a list of only those tokens or token_IDs that correspond to the longest matching prefix and suffix wordpieces in the sample word, without the need for backtracking. Similarly, in some aspects of the present technology, the tokenizer's vocabulary may be organized into a trie structure in which each node has a fail link, and any node that would share token(s) or token_ID(s) of a preceding node is instead given a prev_match link that points back to a chain of one or more ancestor nodes with those token(s) or token_ID(s), thus enabling the tokenizer to parse the trie in a single pass and follow the prev_match links at each failure to collect the tokens or token_IDs, as discussed further below.

In one aspect, the disclosure describes a computer-implemented method comprising: performing, by one or more processors of a processing system, tokenization of a string of text; and providing, by the one or more processors, the array of tokens to a neural network for natural language processing. In that regard, performing tokenization of the string of text comprises: analyzing a first node of a vocabulary trie structure, and identifying a link between the first node and a second node of the vocabulary trie structure corresponding to a first character of the string; determining not to store a token associated with the first node based on the link between the first node and the second node; analyzing the second node, and identifying a link between the second node and a third node of the vocabulary trie structure corresponding to a second character of the string; determining not to store a token associated with the second node based on the link between the second node and the first node; analyzing the third node to determine that the third node has no link corresponding to a third character of the string, and identifying a fail link between the third node and a fourth node of the vocabulary trie structure; storing a first token associated with the third node, the first token representing a word or wordpiece comprised of the first character and the second character of the string; analyzing the fourth node to determine that the fourth node has no link corresponding to the third character of the string; storing a second token associated with the fourth node, the second token representing a word or wordpiece comprised of the third character of the string; and concatenating the first token and the second token to form an array of tokens. In some aspects, the first token comprises a word or wordpiece including the first character and second character of the string, and the second token includes the third character of the string. In some aspects, the first token identifies an entry in a vocabulary for a word or wordpiece including the first character and second character of the string, and the second token identifies an entry in the vocabulary for the third character of the string. In some aspects, the string further comprises a fourth character, and in further aspects, the fourth character is a symbol representing the end of the string.

In another aspect, the disclosure describes a computer-implemented method comprising: performing, by one or more processors of a processing system, tokenization of a string of text; and providing, by the one or more processors, the array of tokens to a neural network for natural language processing. In that regard, performing tokenization of the string of text comprises: analyzing a first node of a vocabulary trie structure, and identifying a link between the first node and a second node of the vocabulary trie structure corresponding to a first character of the string; determining not to store a token based on the link between the first node and the second node; analyzing the second node, and identifying a link between the second node and a third node of the vocabulary trie structure corresponding to a second character of the string; determining not to store a token based on the link between the second node and the first node; analyzing the third node, and identifying a link between the third node and a fourth node of the vocabulary trie structure corresponding to a third character of the string; determining not to store a token based on the link between the third node and the fourth node; analyzing the fourth node, and identifying a link between the fourth node and a fifth node of the vocabulary trie structure corresponding to a fourth character of the string; determining not to store a token based on the link between the fourth node and the fifth node; analyzing the fifth node to determine that the fifth node has no link corresponding to a fifth character of the string, and identifying a fail link between the fifth node and a sixth node of the vocabulary trie structure, and a previous match link between the fifth node and the third node; storing a first token associated with the third node, the first token representing a word or wordpiece comprised of the first character and the second character of the string; storing a second token associated with the fifth node, the second token representing a word or wordpiece comprised of the third character of the string; analyzing the sixth node to determine that the sixth node has no link corresponding to the fifth character of the string, and no previous match link; storing a third token associated with the sixth node, the third token representing a word or wordpiece comprised of the fourth character of the string; and concatenating the first token, the second token, and the third token to form an array of tokens. In some aspects, the first token comprises a word or wordpiece including the first character and second character of the string, the second token includes the third character of the string, and the third token includes the fourth character of the string. In some aspects, the first token identifies an entry in a vocabulary for a word or wordpiece including the first character and second character of the string, the second token identifies an entry in the vocabulary for the third character of the string, and the third token identifies an entry in the vocabulary for the fourth character of the string. In some aspects, the string further comprises a fifth character, and in further aspects, the fifth character is a symbol representing the end of the string.

In another aspect, the disclosure describes a processing system comprising: a memory; and one or more processors coupled to the memory configured to perform tokenization of a string of text, and to provide the array of tokens to a neural network for natural language processing. In that regard, performing tokenization of the string of text comprises: analyzing a first node of a vocabulary trie structure, and identifying a link between the first node and a second node of the vocabulary trie structure corresponding to a first character of the string; determining not to store a token associated with the first node based on the link between the first node and the second node; analyzing the second node, and identifying a link between the second node and a third node of the vocabulary trie structure corresponding to a second character of the string; determining not to store a token associated with the second node based on the link between the second node and the first node; analyzing the third node to determine that the third node has no link corresponding to a third character of the string, and identifying a fail link between the third node and a fourth node of the vocabulary trie structure; storing a first token associated with the third node, the first token representing a word or wordpiece comprised of the first character and the second character of the string; analyzing the fourth node to determine that the fourth node has no link corresponding to the third character of the string; storing a second token associated with the fourth node, the second token representing a word or wordpiece comprised of the third character of the string; and concatenating the first token and the second token to form an array of tokens. In some aspects, the first token comprises a word or wordpiece including the first character and second character of the string, and the second token includes the third character of the string. In some aspects, the first token identifies an entry in a vocabulary for a word or wordpiece including the first character and second character of the string, and the second token identifies an entry in the vocabulary for the third character of the string. In some aspects, the string further comprises a fourth character, and in further aspects, the fourth character is a symbol representing the end of the string.

In another aspect, the disclosure describes a processing system comprising: a memory; and one or more processors coupled to the memory and configured to perform tokenization of a string of text, and to provide the array of tokens to a neural network for natural language processing. In that regard, performing tokenization of the string of text comprises: analyzing a first node of a vocabulary trie structure, and identifying a link between the first node and a second node of the vocabulary trie structure corresponding to a first character of the string; determining not to store a token based on the link between the first node and the second node; analyzing the second node, and identifying a link between the second node and a third node of the vocabulary trie structure corresponding to a second character of the string; determining not to store a token based on the link between the second node and the first node; analyzing the third node, and identifying a link between the third node and a fourth node of the vocabulary trie structure corresponding to a third character of the string; determining not to store a token based on the link between the third node and the fourth node; analyzing the fourth node, and identifying a link between the fourth node and a fifth node of the vocabulary trie structure corresponding to a fourth character of the string; determining not to store a token based on the link between the fourth node and the fifth node; analyzing the fifth node to determine that the fifth node has no link corresponding to a fifth character of the string, and identifying a fail link between the fifth node and a sixth node of the vocabulary trie structure, and a previous match link between the fifth node and the third node; storing a first token associated with the third node, the first token representing a word or wordpiece comprised of the first character and the second character of the string; storing a second token associated with the fifth node, the second token representing a word or wordpiece comprised of the third character of the string; analyzing the sixth node to determine that the sixth node has no link corresponding to the fifth character of the string, and no previous match link; storing a third token associated with the sixth node, the third token representing a word or wordpiece comprised of the fourth character of the string; and concatenating the first token, the second token, and the third token to form an array of tokens. In some aspects, the first token comprises a word or wordpiece including the first character and second character of the string, the second token includes the third character of the string, and the third token includes the fourth character of the string. In some aspects, the first token identifies an entry in a vocabulary for a word or wordpiece including the first character and second character of the string, the second token identifies an entry in the vocabulary for the third character of the string, and the third token identifies an entry in the vocabulary for the fourth character of the string. In some aspects, the string further comprises a fifth character, and in further aspects, the fifth character is a symbol representing the end of the string.

DETAILED DESCRIPTION

The present technology will now be described with respect to the following exemplary systems and methods.

Example Systems

Figure 1:
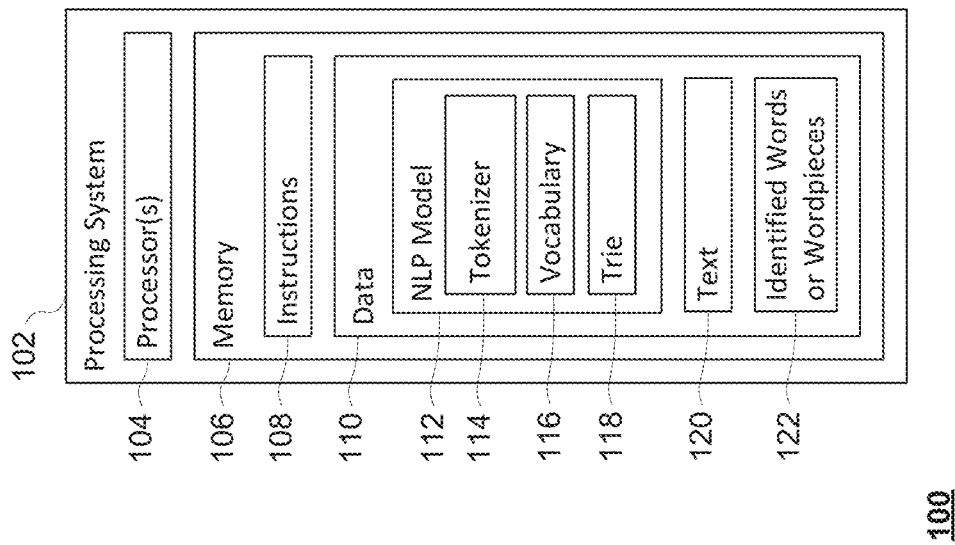
FIG. 1 is a functional diagram of an example system in accordance with aspects of the disclosure.

A high-level system diagram 100 in accordance with aspects of the technology is shown in FIG. 1. Processing system 102 includes one or more processors 104, and memory 106 storing instructions 108 and data 110. Data 110 includes a set of original text 120, a natural language processing model 112, and a set of identified words or wordpieces 122. The natural language processing model 112 includes a tokenizer 114, a vocabulary 116, and a trie structure 118 based on the contents of the vocabulary 116. As explained further below, the tokenizer 114 may use trie structure 118 to generate the set of identified words or wordpieces 122 from original text 120. In some aspects of the technology, vocabulary 116 may be a learned vocabulary generated by training the tokenizer 114 on unlabeled data.

Processing system 102 may be implemented on any type of computing device(s), such as any type of general computing device, server, or set thereof, and may further include other components typically present in general purpose computing devices or servers. Memory 106 stores information accessible by the one or more processors 104, including instructions 108 and data 110 that may be executed or otherwise used by the processor(s) 104. Memory 106 may be of any non-transitory type capable of storing information accessible by the processor(s) 104. For instance, memory 106 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

The computing devices may comprise a speech recognition engine configured to convert a speech input by a user into a microphone associated with the computing device into text data. Such an input may be a user query directed towards, for example, an automated assistant accessible through the computing device. The text data generated from the user voice input may be processed using any of the methods described herein to tokenize the text data for further processing. The tokenized text data may, for example, be processed to extract a query for the automated assistant that is present in the user voice input. The query may be sent to the automated assistant, which may in turn provide one or more services to the user in response to the query via the computing device.

Example Methods

In addition to the systems described above and illustrated in the figures, various operations will now be described. For clarity, the exemplary methods described herein and depicted in FIGS. 2-9 all assume that the input string will be a word, and that the vocabulary will be comprised of wordpieces consisting of strings of letters from the English (or Latin) alphabet. However, the present technology can be applied to any written language. Further in that regard, as some written languages such as Chinese do not insert spaces between words, the present technology may be used to break a string of characters which represents multiple words down into segments that each represent a single word. In such a case, the present technology will operate in the same way described in the following examples, but the input text will be a string of characters representing multiple Chinese words (rather than a string of characters representing a single word), and the output will be an array of tokens each of which identifies a single Chinese word found within the input string (rather than an array tokens each of which identifies a wordpiece found within the input string).

In that regard, there are multiple ways that a processing system could be configured to convert a given string of text into the longest known wordpieces. For example, a processing system could be configured to use a right-to-left brute-force approach in which each word is first looked up in the vocabulary, and if the word is not present, it is then decremented by one character, and the process is repeated. In such a paradigm, once a wordpiece is located, it is identified as a prefix, and the processing system then processes the characters following the first wordpiece until it locates the largest suffix wordpieces in what remains. Using this right-to-left brute-force approach, the word "unknowable" may be processed as shown in Table 1, below:

As can be seen from Table 1 above, the right-to-left brute-force approach in this case identifies three known wordpieces over the course of fifteen queries. However, in a worst-case scenario, where a word with n characters does not end up containing any known wordpieces larger than a single character, the processing system will have to perform n(n+1)/2 separate queries to process the entire word, making the time for inference on the order of $n^2$.

Likewise, in another example, a processing system could be configured to use a left-to-right brute-force approach in which the first letter of a word is looked up in the vocabulary, then the first and second letters, then the first through third letters, and so on, until the longest matching prefix is located. In such a paradigm, once a wordpiece is located, it is identified as a prefix, and the processing system then processes the characters following the first wordpiece until it locates the largest suffix wordpiece or wordpieces in what remains. Using this left-to-right brute-force method, the word "unknowable" may be processed as shown in Table 2, below:

TABLE 1

Vocabulary: {[all individual characters as prefixes and suffixes], un, unknown, ##know, ##known, ##knowledge, ##knowledgeable, ##able, ##ably} "##" is a suffix indicator for a string found in the middle of a word

| Pass | Query | Result |
|---|---|---|
| 1 | Processing system checks if vocabulary contains "unknowable" | No. Processing system decrements search string by one character. |
| 2 | Processing system checks if vocabulary contains "unknowabl" | No. Processing system decrements search string by one character. |
| 3 | Processing system checks if vocabulary contains "unknowab" | No. Processing system decrements search string by one character. |
| 4 | Processing system checks if vocabulary contains "unknowa" | No. Processing system decrements search string by one character. |
| 5 | Processing system checks if vocabulary contains "unknow" | No. Processing system decrements search string by one character. |
| 6 | Processing system checks if vocabulary contains "unkno" | No. Processing system decrements search string by one character. |
| 7 | Processing system checks if vocabulary contains "unkn" | No. Processing system decrements search string by one character. |
| 8 | Processing system checks if vocabulary contains "unk" | No. Processing system decrements search string by one character. |
| 9 | Processing system checks if vocabulary contains "un" | Yes. Processing system 102 sets "un" as the first identified wordpiece. |
| 10 | Processing system checks if vocabulary contains "##knowable" | No. Processing system decrements search string by one character. |
| 11 | Processing system checks if vocabulary contains "##knowabl" | No. Processing system decrements search string by one character. |
| 12 | Processing system checks if vocabulary contains "##knowab" | No. Processing system decrements search string by one character. |
| 13 | Processing system checks if vocabulary contains "##knowa" | No. Processing system decrements search string by one character. |
| 14 | Processing system checks if vocabulary contains "##know" | Yes. Processing system 102 sets "##know" as the second identified wordpiece. |
| 15 | Processing system checks if vocabulary contains "##able" | Yes. Processing system sets "##able" as the third identified wordpiece. |

TABLE 2

Vocabulary: {[all individual characters as prefixes and suffixes], un, unknown, ##know, ##known, ##knowledge, ##knowledgeable, ##able, ##ably}

| Pass | Query | Result |
|---|---|---|
| 1 | Processing system checks if vocabulary contains "u" or any wordpiece beginning with "u" | Yes - vocabulary includes "u," and wordpieces beginning with "u" ("un" and "unknown"). Processing system increments search string by one character. |
| 2 | Processing system checks if vocabulary contains "un" or any wordpiece beginning with "un" | Yes - vocabulary includes "un," and wordpieces beginning with "un" ("unknown"). Processing system increments search string by one character. |
| 3 | Processing system checks if vocabulary contains "unk" | Yes - vocabulary does not include "unk," but does include a wordpiece beginning with "unk" ("unknown"). Processing system increments search string by one character. |
| 4 | Processing system checks if vocabulary contains "unkn" | Yes - vocabulary does not include "unkn," but does include a wordpiece beginning with "unkn" ("unknown"). Processing system increments search string by one character. |
| 5 | Processing system checks if vocabulary contains "unkno" | Yes - vocabulary does not include "unkno," but does include a wordpiece beginning with "unkno" ("unknown"). Processing system increments search string by one character. |
| 6 | Processing system checks if vocabulary contains "unknow" | Yes - vocabulary does not include "unknow," but does include a wordpiece beginning with "unknow" ("unknown"). Processing system increments search string by one character. |
| 7 | Processing system checks if vocabulary contains "unknowa" | No - vocabulary does not include "unknowa" or a wordpiece beginning with "unknowa." Processing system 102 sets last largest known wordpiece ("un") as the first identified wordpiece. |
| 8 | Processing system checks if vocabulary contains "##k" | Yes - vocabulary includes "##k" and wordpieces beginning with "##k" ("##know," "##known," "##knowledge," "##knowledgeable"). Processing system increments search string by one character. |
| 9 | Processing system checks if vocabulary contains "##kn" | Yes - vocabulary does not include "##kn," but does include wordpieces beginning with "##kn" ("##know," "##known," "##knowledge," "##knowledgeable"). Processing system increments search string by one character. |
| 10 | Processing system checks if vocabulary contains "##kno" | Yes - vocabulary does not include "##kno," but does include wordpieces beginning with "##kno" ("##know," "##known," "##knowledge," "##knowledgeable"). Processing system increments search string by one character. |
| 11 | Processing system checks if vocabulary contains "##know" | Yes - vocabulary includes "##know," and wordpieces beginning with "##know" ("##know," "##known," "##knowledge," "##knowledgeable"). Processing system increments search string by one character. |
| 12 | Processing system checks if vocabulary contains "##knowa" | No - vocabulary does not include "##knowa" or a wordpiece beginning with "##knowa." Processing system 102 sets last largest known wordpiece ("##know") as the second identified wordpiece. |
| 13 | Processing system checks if vocabulary contains "##a" | Yes - vocabulary includes "##a" and wordpieces beginning with "##a" ("##able," "##ably"). Processing system increments search string by one character. |

TABLE 2-continued

Vocabulary: {[all individual characters as prefixes and suffixes],
un, unknown, ##know, ##known, ##knowledge, ##knowledgeable, ##able, ##ably}

| Pass | Query | Result |
|---|---|---|
| 14 | Processing system checks if vocabulary contains "##ab" | Yes - vocabulary does not include "##ab," but does include wordpieces beginning with "##ab" ("##able," "##ably"). Processing system increments search string by one character. |
| 15 | Processing system checks if vocabulary contains "##abl" | Yes - vocabulary does not include "##abl," but does include wordpieces beginning with "##abl" ("##able," "##ably"). Processing system increments search string by one character. |
| 16 | Processing system checks if vocabulary contains "##able" | Yes - vocabulary includes "##able." Processing system identifies "##able" as the third and final wordpiece. |

As can be seen from Table 2 above, the left-to-right brute-force approach in this case identifies three known wordpieces over the course of sixteen queries. However, in this instance as well, where a word with n characters does not end up containing any known wordpieces larger than a single character, the processing system will again have to perform n(n+1)/2 separate queries to process the entire word, making the time for inference on the order of $n^2$.

Likewise, in another example, a processing system could be configured to use an Aho-Corasick string-searching algorithm. An Aho-Corasick algorithm can be used to convert the vocabulary into a trie structure with suffix links and dictionary suffix links. That trie structure can then be parsed to identify all known strings that match a piece of input text. For example, if a vocabulary includes {a, ab, bab, bc, bca, c, caa}, an Aho-Corasick algorithm processing input string "abccab" would identify every possible match within that input string, including matches that duplicate or overlap with others, producing an output of: {a, ab, bc, c, c, a, ab}. Thus, for NLP techniques that rely upon a left-to-right longest-match-first greedy process for wordpiece tokenization, the Aho-Corasick algorithm identifies more matches than are needed, requiring additional post-processing steps to reduce the list of all matching wordpieces down to only the largest matching prefix, and each next longest suffix. Moreover, in the worst-case scenario where every substring in a given word of n characters matches a token in the vocabulary, the time for inference is on the order of $n^2$.

In contrast, in the present technology, processing system 102 is configured to use a modified trie structure 118. In that regard, in the present technology, rather being designed to identify all known wordpieces in a given sample of text, trie 118 is configured to identify only the longest known prefix, and each next longest suffix, until there are no more characters of the sample text that remain to be matched. As a result, the present technology enables a faster identification of the longest prefix and suffix tokens than the examples mentioned above. More particularly, the present technology enables a time for inference for word of n characters that is on the order of n.

Figure 2A:
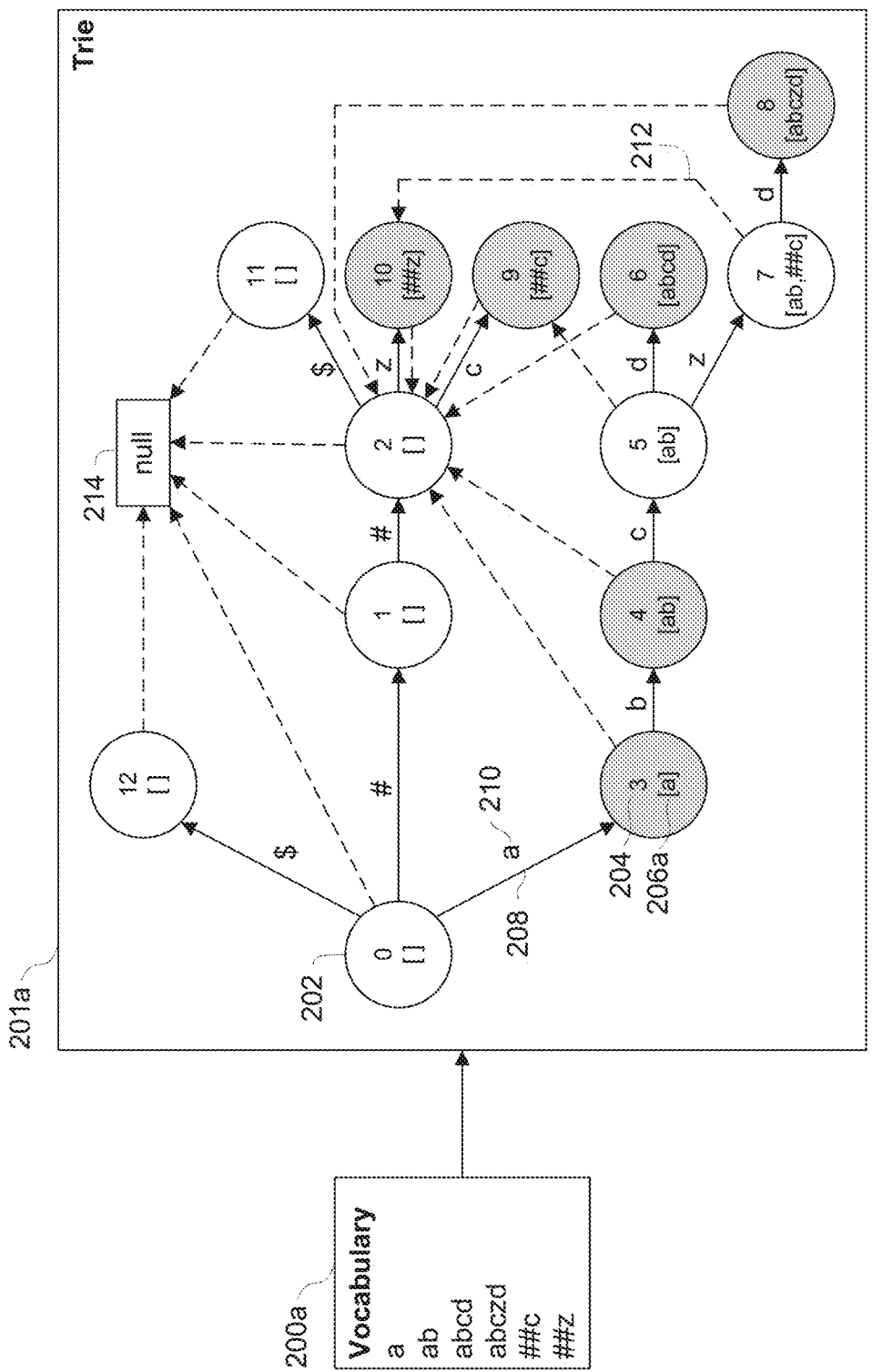
FIG. 2A depicts an exemplary vocabulary and corresponding trie structure in accordance with aspects of the disclosure.

FIG. 2A depicts an exemplary vocabulary and corresponding trie structure in accordance with aspects of the technology. In the example of FIG. 2A, vocabulary 200a contains six wordpieces: a; ab; abcd; abczd; ##c; and ##z. As above, "##" is a suffix indicator showing that the wordpiece in question begins in the middle of a word, and thus must have at least one character preceding it in any matching sample of text. Likewise, "$" is a character used to identify the end of the input string. In this example, vocabulary 200a is converted into a trie structure 201a. Trie structure 201a may be embodied as any data structure suitable for processing by tokenizer 114. However, for the purposes of explanation, trie structure 201a is shown pictorially in FIG. 2A. In that regard, each of the circles in FIG. 2A (e.g., reference number 202) represents a node in trie structure 201a. Each circular node has a numerical node_ID at the top (e.g., reference number 204), and one or more wordpieces in brackets at the bottom (e.g., reference number 206a), which are the precomputed full-pop tokens for that node. Nodes with "[ ]" do not have a full-pop token associated with them.

The solid arrows (e.g., reference number 208) of trie structure 201a represent goto links, and the characters next to each arrow (e.g., reference number 210) represent the condition for following that goto link. Thus, assuming that the tokenizer 114 of processing system 102 is attempting to tokenize "abcz$," it will begin by analyzing the root node with node_ID 0 to determine if it has a goto link corresponding to the first character of "abcz$." In this case, because there is a goto link 208 conditioned on "a" which extends from the root node, the tokenizer 114 will identify goto link 208 and follow it the node with node_ID 3.

The dashed arrows (e.g., reference number 212) of trie structure 201a represent fail links. Thus, continuing with the same example, as the second character of "abcz$" is "b," the tokenizer 114 will analyze the node with node_ID 3 and identify the goto link for "b." The tokenizer 114 will thus follow the goto link for "b" to arrive at the node with node_ID 4. Likewise, as the third character of "abcz$" is "c," the tokenizer 114 will identify the goto link for "c" and follow it to arrive at the node with node_ID 5. Similarly, as the fourth character of "abcz$" is "z," the tokenizer 114 will identify the goto link for "z" and follow it to arrive at the node with node_ID 7. However, when the tokenizer 114 analyzes the node with node_ID 7, it will not be able to identify a goto link corresponding to the fifth character of "abcz$." Thus, the tokenizer 114 will instead collect (e.g., store in a variable) the precomputed full-pop tokens ("ab" and "##c") of the node at which it failed to move on (the node with node_ID 7), and will then follow that node's fail link 212 to the node with node_ID 10. Because the tokenizer 114 only collects full-pop tokens when it cannot reach the next node using a goto link, the collected tokens automatically represent the longest segments of the sample text that match a known wordpiece in vocabulary 200a. Thus, in this example, the longest prefix within "abcz$" that is in vocabulary 200a is identified as "ab," and the longest suffix that immediately follows "ab" is identified as "##c."

Continuing with the same example, after following fail link 212 to the node with node_ID 10, the tokenizer 114 will attempt to follow the next goto link. However, as the node with node_ID 10 has no further goto links, the tokenizer 114 will be forced to again collect the full-pop token ("##z") of that node, and follow its fail link to the node with node_ID 2. This full-pop token is concatenated with the previous full-pop tokens that were collected to generate an array of three full-pop tokens ("ab," "##c," "##z").

Once at the node with node_ID 2, the tokenizer 114 will try to find a goto link for "$," the fifth character of "abcz$." As already noted, the "$" character is a special character that denotes the end of the input string. As the trie structure 201a is configured with a goto link dedicated to the end-of-input character "$," the tokenizer 114 will follow that link to the node with node_ID 11. As there are no further characters to process in "abcz$," the tokenizer 114 will stop parsing trie structure 201a. The process will thus conclude with the existing array of three full-pop tokens ("ab," "##c," "##z").

Although the examples set forth herein utilize an end-of-input character, the present technology does not require one. Thus, in some aspects of the technology, there will be no end-of-input character and no nodes corresponding thereto in the trie structure, and the tokenizer 114 will simply stop parsing when there are no more actual characters in the word which remain to be processed. In that regard, in the example just described, if the tokenizer were attempting to tokenize "abcz" rather than "abcz$," then after following the goto link for "z" to arrive at the node with node_ID 7 (at which point there would be no further characters to process), the tokenizer will collect the full-pop tokens of that node ("ab," "##c") and recursively follow the fail links from the node with node_ID 7 and collect any full-pop tokens of those linked nodes. Thus, in this case, the tokenizer 114 will follow fail link 212 to the node with node_ID 10. The tokenizer will then collect the full-pop token of the node with node_ID 10 ("##z") and follow its fail link to the node with node_ID 2. When it reaches the node with node_ID 2, which represents the suffix indicator "##," the process will end. Notably, this will result in the same array of three full-pop tokens ("ab," "##c," "##z"). However, if the tokenizer 114 were to instead encounter an empty fail link before it reaches the suffix indicator node (the node with node_ID 2), that would indicate that the input word could not be successfully tokenized. In such a case, the tokenizer 114 would map the entire word to a single token such as "<unk>" which indicates that the word is unknown, and then the process would end.

In some cases, a node may have an empty fail link. For example, the fail links for the root node (the node with node_ID 0) and the suffix root node (the node with node_ID 2) will both have empty fail links. For purposes of illustration, these empty fail links are represented in FIG. 2A as dashed arrows pointing to a rectangular "null" box identified with reference number 214.

It will be appreciated that the example vocabulary, wordpieces, and words used herein are for illustration purposes only. In that regard, the tokenizer 114 may output arrays with any number of full-pop tokens, depending on the size of the string being tokenized and the available tokens.

Figure 2B:
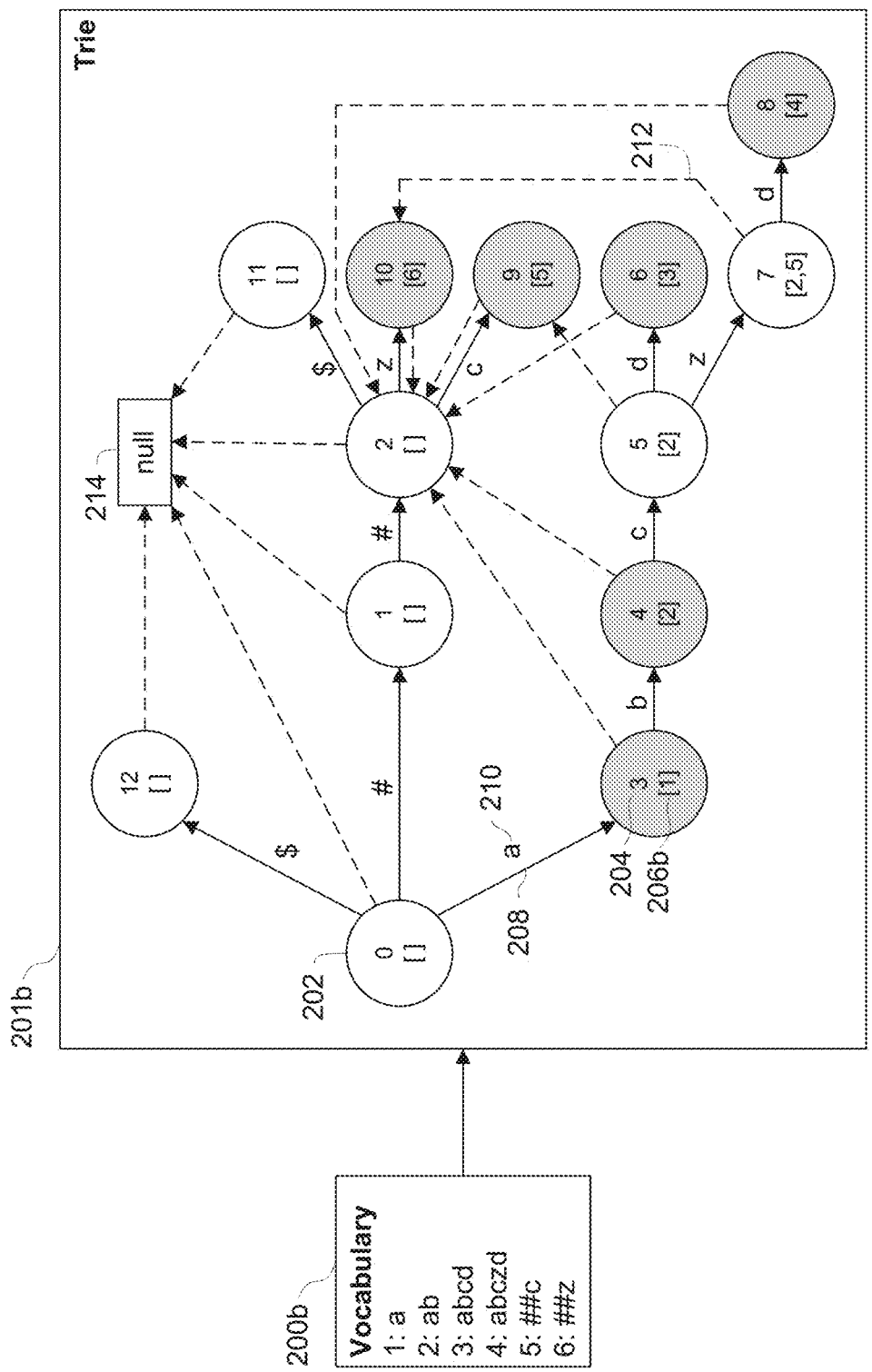
FIG. 2B depicts an exemplary vocabulary and corresponding trie structure in accordance with aspects of the disclosure.

FIG. 2B also depicts an exemplary vocabulary and corresponding trie structure in accordance with aspects of the technology. In the example of FIG. 2B, vocabulary 200b is the same as vocabulary 200a of FIG. 2A, except that each word in vocabulary 200b is further associated with a corresponding token_ID. For example, the first wordpiece "a" in vocabulary 200b is associated with token_ID "1." Likewise, FIG. 2B's trie structure 200b is the same as the trie structure 200a of FIG. 2A, and will be constructed in the same way, except that each node of trie structure 200b contains a numerical full-pop token_ID in brackets (e.g., reference number 206b) rather than the text of the full-pop token. In the example of FIG. 2B, the full-pop token_ID can be used in conjunction with vocabulary 200b to determine the text of the associated full-pop token. Other than the differences just described, the trie structures of FIGS. 2A and 2B are the same, and all reference numerals common between the two figures identify the same features. Thus, tokenizer 114 will parse trie structure 201b of FIG. 2B in the same manner as described above with respect to trie structure 201a of FIG. 2A, but instead of collecting the text of each full-pop token, it will collect numerical full-pop token_IDs. Accordingly, in the example of FIG. 2B, after tokenizer 114 reaches the node with node_ID 11 and has no more characters to process, it will stop parsing the trie structure 201b and then use the collected full-pop token_IDs (2, 5, 6) to identify the corresponding full-pop tokens (ab, ##c, ##z).

Figure 3A:
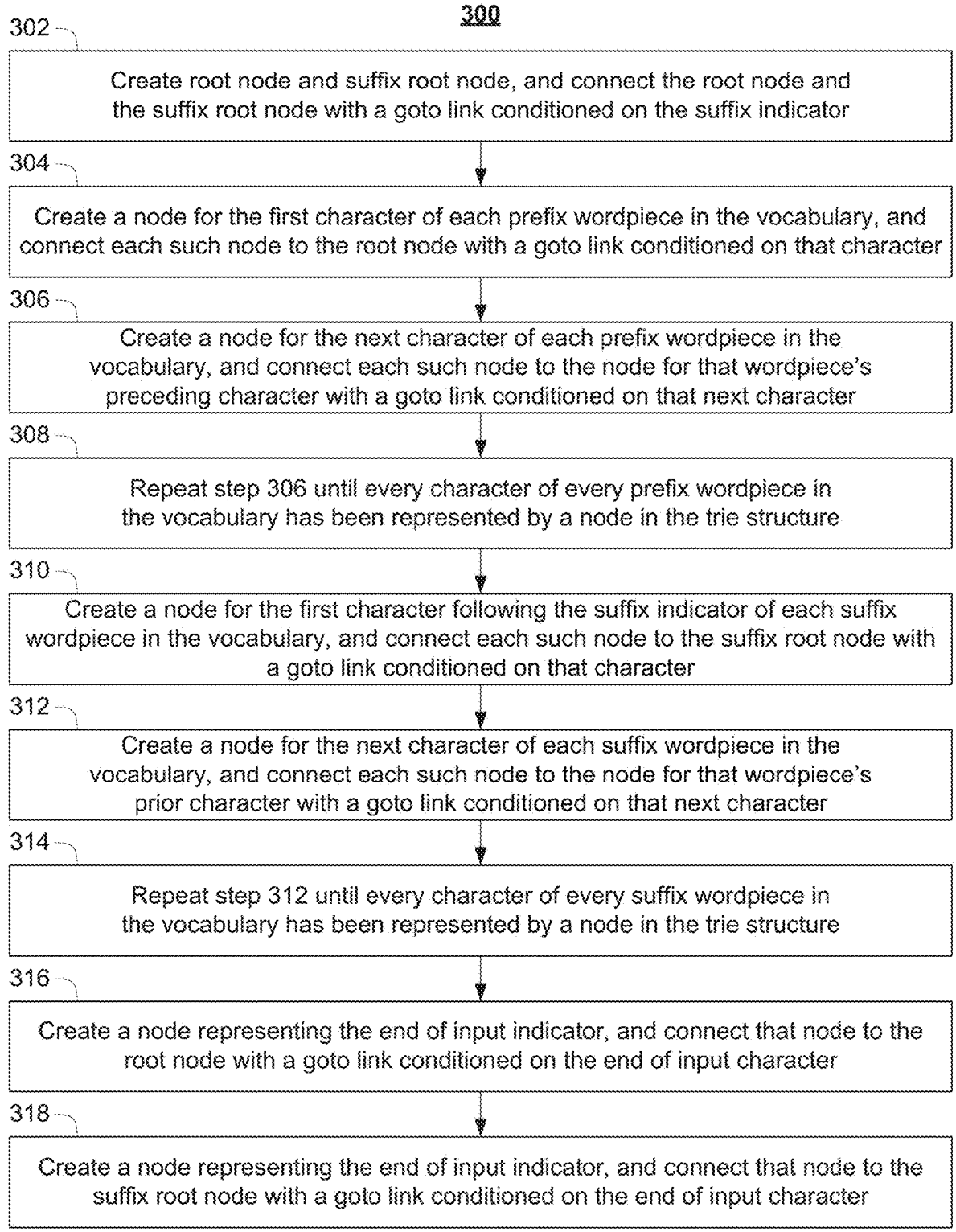
FIGS. 3A-3C are flow diagrams of an exemplary method of constructing a trie structure in accordance with aspects of the disclosure.
Figure 3B:
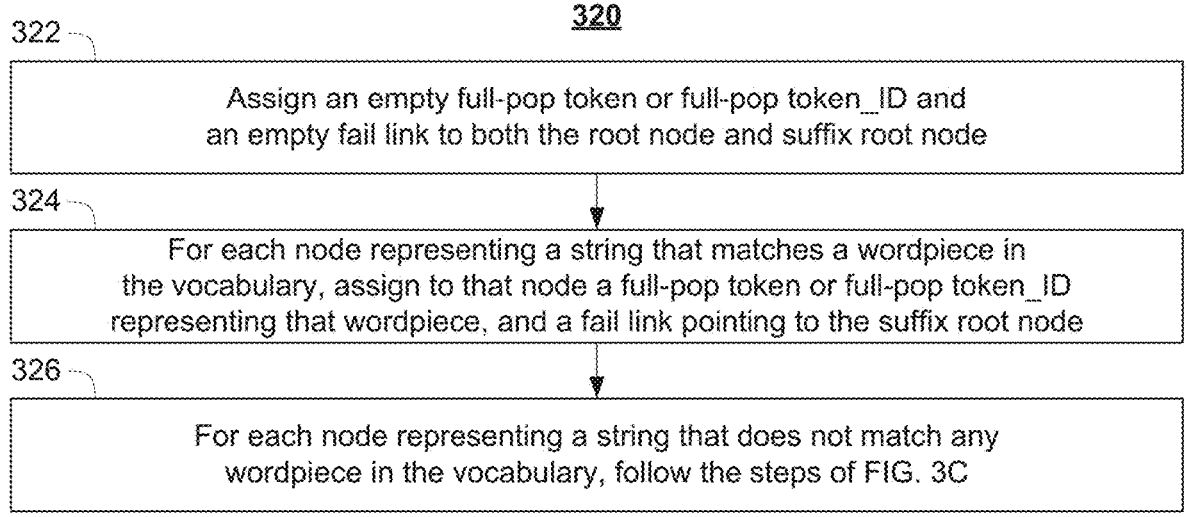
Figure 3C:
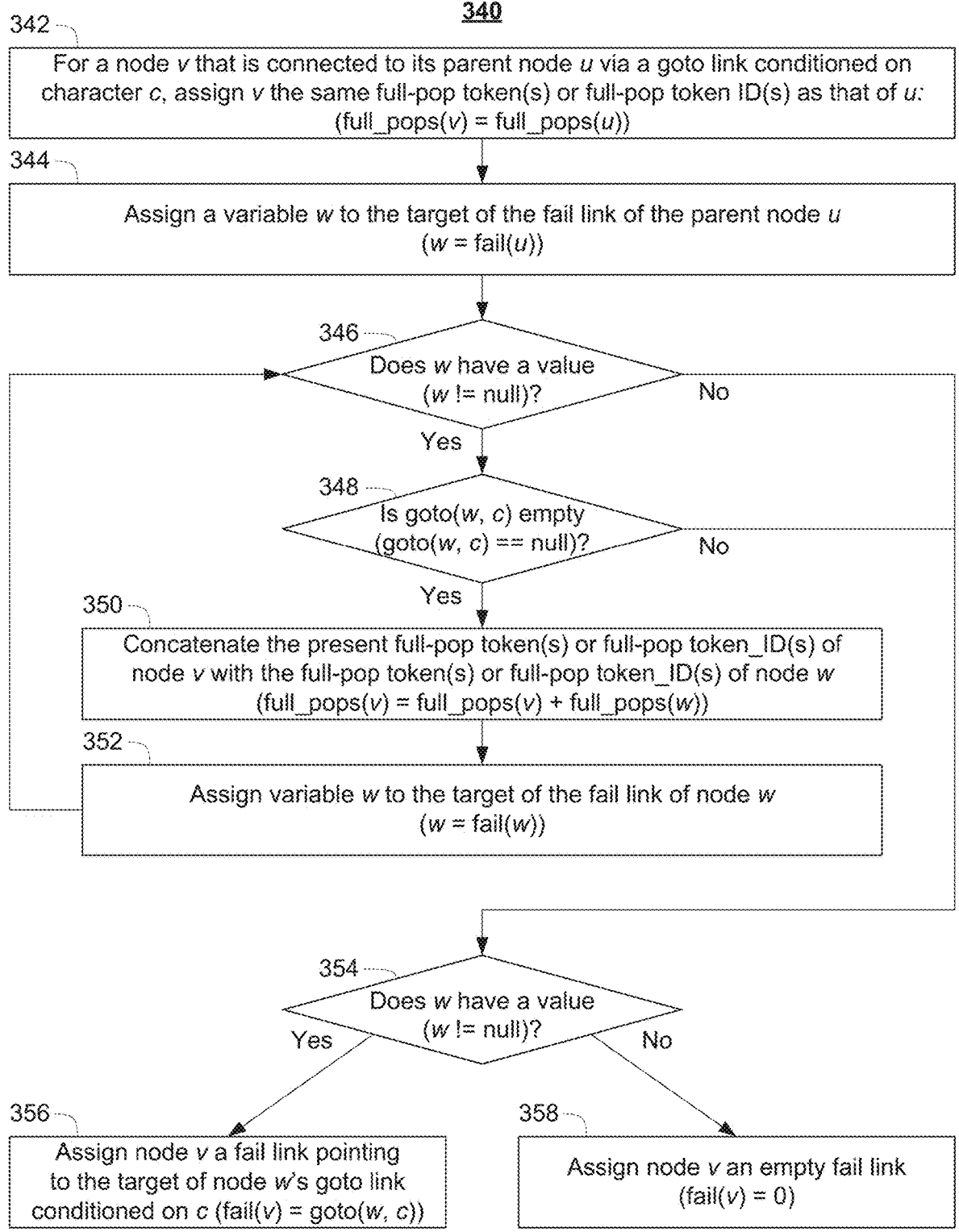

FIGS. 3A-3C are flow diagrams of an exemplary method of constructing a trie structure of the type shown in the examples of FIGS. 2A and 2B. Thus, beginning with method 300 shown in FIG. 3A, in step 302, a root node (the node with node_ID 0 in FIGS. 2A and 2B) and a suffix root node (the node with node_ID 2 in FIGS. 2A and 2B) will be created, and a goto link will be created between them conditioned on the suffix indicator. However, as the example of FIGS. 2A and 2B employ a suffix indicator that includes two successive pound marks ("##"), an intermediate node will also need to be created between the root node and the suffix root node to represent a single "#" character. A first goto link will then be extended from the root node to the node for "#" (the node with node_ID 1) conditioned on "#," and a second goto link conditioned on "#" will be extended from the node for "#" to the suffix root node. The present technology does not require the use of "##" as a suffix indicator. In that regard, any other suitable suffix indicator may be used, including ones that use other characters, a single character, multiple characters, etc. In addition, in some aspects of the technology, a suffix indicator may be omitted from the wordpieces of the vocabulary, and the corresponding trie structure may therefore have an empty suffix indicator (e.g., the node with node_ID 2 will collapse into the node with node_ID 0) or the suffix indicator may be omitted from the trie structure entirely. For example, employing an empty suffix indicator may be advantageous where the present technology is used for Chinese word segmentation.

In step 304, a node will be created for each prefix wordpiece in the vocabulary, and each such node will be connected to the root node via a goto link conditioned on that character. Thus, in the example of FIG. 2A, because all of the prefix wordpieces in vocabulary 200a begin with the letter "a," there will only be one node created in this step, and one goto link from the root node (the node with node_ID 0) to the node for "a" (the node with node_ID 3).

In step 306, a node will be created for the next character of each prefix wordpiece in the vocabulary, and each such node will be connected to the node for its preceding character via a goto link conditioned on that next character. Thus, in the example of FIG. 2A, because all of the wordpieces in vocabulary 200a that start with letter "a" have a second character of "b," there will only be one goto link extending from the node for "a" to the node for "ab" (the node with node_ID 4). Although the vocabulary in the example of FIG. 2A only contains wordpieces that begin with "a," if it contained wordpieces that began with another character such as "b," then this same process would be repeated in order to create a branch representing all such wordpieces that begin with "b." Likewise, if the vocabulary were to include one or more prefix wordpieces that begin with a single "#" character, a branch may also extend from the node with node_ID 1.

In step 308, the process of step 306 will be repeated for each next character of each prefix wordpiece in the vocabulary until every prefix wordpiece has been fully represented by a node in the trie structure. Thus, in the example of FIG. 2A, because all of the wordpieces in vocabulary 200a that start with the letters "ab" have a third character of "c," there will only be one goto link extending from the node for "ab" to the node for "abc" (the node with node_ID 5). In contrast, because the wordpieces in vocabulary 200a that begin with "abc" can have either a "d" or a "z" as their fourth character, there will be two goto links extending from the node for "abc"—one that extends to the node for "abcd" (the node with node_ID 6), and one that extends to the node for "abcz" (the node with node_ID 7). Finally, a goto link will be extended from the node for "abcz" to the node for "abczd" (the node with node_ID 8) to represent the last remaining wordpiece in vocabulary 200a that begins with "a."

In step 310, a node will be created for each suffix wordpiece in the vocabulary, and each such node will be connected to the suffix root node via a goto link conditioned on the first character following the suffix indicator. Thus, in the example of FIG. 2A, a node will be created for "##c," and it will be connected to the suffix root node via a goto link conditioned on "c." Likewise, a node will be created for "##z," and it will be connected to the suffix root node via a goto link conditioned on "z."

In step 312, a node will be created for the next character of each suffix wordpiece in the vocabulary, and each such node will be connected to the node for its preceding character via a goto link conditioned on that next character. As shown in step 314, the process of step 312 will be repeated for each next character of each suffix wordpiece in the vocabulary until every suffix wordpiece has been fully represented by a node in the trie structure. However, in the example of FIG. 2A, as the vocabulary only contains suffix wordpieces with a single character following the suffix indicator, the branches will not extend past the "##c" and "##z" nodes created pursuant to step 310.

Finally, in steps 316 and 318, nodes will be created for the end-of-input character. In that regard, in step 316, a first such node will be created, and connected to the root node via a goto link conditioned on the end-of-input character. Thus, in the example of FIG. 2A, the node with node_ID 12 will be created, and a goto link will be extended to it from the root node that is conditioned on the character "$." Likewise, in step 318, a second such node will be created, and connected to the suffix root node via a goto link conditioned on the end-of-input character. Thus, in the example of FIG. 2A, the node with node_ID 11 will be created, and a goto link will be extended to it from the suffix root node that is also conditioned on the character "$." Again, the present technology does not require that an end-of-input character be employed. Thus, where an end-of-input character is not used, steps 316 and 318 may be omitted.

Once all wordpieces in the vocabulary are represented in the trie structure, full-pop tokens (e.g., reference number 206a) and fail links (e.g., reference number 212) may be computed and added to the trie structure as shown in methods 320 and 340 of FIGS. 3B and 3C, respectively. In that regard, as shown in step 322 of FIG. 3B, both the root node (the node with node_ID 0) and the suffix root node (the node with node_ID 2) will be assigned full-pop tokens and fail links that are empty (null).

In step 324, for each node representing a string that matches a wordpiece in the vocabulary, that node will be assigned a full-pop token or full-pop token_ID corresponding to the wordpiece it represents, and a fail link that points to the suffix root node (the node with node_ID 2). Thus, in the example of FIG. 2A, because the vocabulary 200a includes a wordpiece "ab," the node for string "ab" (the node with node_ID 4) will get a full-pop token of "ab," and a fail link pointing to the node for "##" (the suffix root node with node_ID 2). Likewise, because the vocabulary 200a includes a suffix wordpiece "##c," the node for string "##c" (the node with node_ID 9) will get a full-pop token of "##c" and a fail link pointing back to the node for "##."

As shown in step 326, for any node representing a string that is not in the vocabulary, its full-pop token(s) and fail link will be computed according to method 340 of FIG. 3C. In that regard, FIG. 3C describes processing according to Algorithm 1 set forth below. In Algorithm 1 below, the node for which the full-pop token(s) and fail link are being computed is identified by v, its parent node is identified by u, and the goto link connecting u to v is conditioned on character c. The function fail(x) returns the node_ID of the target of the fail link for the node with node_ID x. Thus, in the example of FIG. 2A, fail(3) would return 2, because the node with node_ID 3 has a fail link pointing to the node with node_ID 2. The function goto(x, c) returns the node_ID of the target of the goto link which extends from the node with node_ID x, and which is conditioned on character c. The result of function goto(x, c) will be null if the node with node_ID x has no goto link conditioned on c. Thus, in the example of FIG. 2A, goto(3, "b") would return 4, because the node with node_ID 3 has a goto link conditioned on the character "b" that points to the node with node_ID 4. The function full_pops(x) returns the full-pop token(s) of the node with node_ID x. The symbol "!=" indicates the logic test "is not equal to." The symbol "==" indicates the logic test "is equal to." The operation x=y indicates that variable x is being assigned a value of y. The operation "+" as used below indicates that the values will be concatenated (e.g., if x is [a] and y is [b], then x+y will be [a, b]). The WHILE, IF, ELSE, and operations all function as commonly understood in the art of computer programming.

| Algorithm 1: |  |
|---|---|
| Line 01: | full_pops(v) = full_pops(u) |
| Line 02: | w = fail(u) |
| Line 03: | WHILE w != null AND goto(w, c) == null: |
| Line 04: | full_pops(v) = full_pops(v) + full_pops(w) |
| Line 05: | w = fail(w) |
| Line 06: | IF w != null: |
| Line 07: | fail(v) = goto(w, c) |
| Line 08: | ELSE: |
| Line 09: | fail(v) = 0 |

Thus, according to Line 01 of Algorithm 1 above, any node v representing a string that is not in the vocabulary will initially be assigned the same full-pop token as was previously computed for its parent node. This operation is represented by step 342 of FIG. 3C. Likewise, according to Line 02 of Algorithm 1, a variable w will initially be assigned the same value as the fail link of parent node u. This operation is represented by step 344 of FIG. 3C. Thus, in the example of FIG. 2A, if v is node_ID 5, u is node_ID 4, and c is character "c," then full_pops(v) will initially be assigned a full-pop token of "ab" because that is the full-pop token that will previously have been computed for its parent node u (the node with node_ID 4) according to step 324. Continuing with the same example, variable w will initially be assigned a value of "2" because parent node u (the node with node_ID 4) has a fail link pointing to the node with node_ID 2.

According to Lines 03-05 of Algorithm 1, a while loop will begin, each loop of which is conditioned on variable w not being null, and on node w having no goto link conditioned on character c. These two initial conditions are represented in steps 346 and 348, respectively, of FIG. 3C. Based on the initial value of w being 2, the first condition of Line 03 (and step 346) will be satisfied. However, based on c being character "c," the function goto(2, "c") will return a value of 9 because the node with node_ID 2 has a goto link conditioned on "c" that points to the node with node_ID 9, thus failing to satisfy the second condition of Line 03 (and step 348). Thus, in the present example, the process will skip Line 04 and Line 05, and proceed to Line 06. This is represented in FIG. 3C by the "no" arrow connecting step 348 to step 354.

According to Lines 06 and 07 of Algorithm 1, if w is not null, then fail(v) will be assigned the same value as goto(w, c). This condition and result is represented in FIG. 3C by the "yes" arrow connecting step 354 to step 356. Thus, in the present example, because w still has a value of "2," and because the node with node_ID 2 has a goto link conditioned on character "c" that points to the node with node_ID 0, the fail link for node v will be assigned a value of 9 so that it also points to the node with node_ID 9. The processing will therefore conclude with the node with node_ID 5 keeping its initially assigned full-pop token of "ab," being assigned a fail link pointing to the node with node_ID 9.

On the other hand, according to Lines 06, 08, and 09 of Algorithm 1, if w were instead null, then fail(v) would be assigned a null value as well (given an empty fail link). This condition and result is represented in FIG. 3C by the "no" arrow connecting step 354 to step 358.

After the process just described has been completed, it may be repeated for each next node, making use of the full-pop token(s) and fail link computed for each prior node. Thus, after the process concludes in the example just described, u may become node_ID 5 and v may become node_ID 7, making c become character "z." With these new parameters, according to Line 01 of Algorithm 1 (and step 342), full_pops(v) will initially be assigned a full-pop token of "ab" because that is the full-pop token that will have just been computed for its parent node u (the node with node_ID 5), as described above. Likewise, according to Line 02 of Algorithm 1 (and step 344), variable w will initially be assigned a value of "9" because the fail link for node u (computed in the prior round of processing, described above) points to the node with node_ID 9. Based on these values of w and c, w will not be null, and goto(w, c) will initially be null because the node with node_ID 9 has no goto links conditioned on character "z." As such, both conditions in Line 03 of Algorithm 1 will be satisfied, and the while loop will proceed to Line 04. This set of conditions and results are represented in FIG. 3C by the "yes" arrow connecting step 346 to step 348, and the "yes" arrow connecting step 348 to step 350.

According to Line 04 of Algorithm 1, the initial value of full_pops(v) will be incremented by full_pops(w). This operation is represented by step 350 of FIG. 3C. Because the node with node_ID 9 has a previously computed full-pop token of "##c" from step 324, and because full_pops(v) was initially assigned a value of "ab" in step 342, the values are concatenated so that full_pops(v) becomes ["ab," "##c"]. Then, in Line 05 of Algorithm 1, w is assigned a new value corresponding to the target of the fail link of the node with node_ID w. This operation is represented by step 352 of FIG. 3C. Thus, in the present example, because w has a value of 9, and because the node with node_ID 9 has a fail link that points to the node with node_ID 2, w is reassigned a value of 2 in Line 05. The process will then return to Line 03 with w having a new value of 2. This is represented by the arrow connecting step 352 back to step 346 in FIG. 3C. However, on this second pass, goto(2, "z") will return a value of 10 because the node with node_ID 2 has a goto link conditioned on character "z" which points to the node with node_ID 10. Thus, goto(w, c) will not be null, and the conditions for the while loop (Line 03 of Algorithm 1; step 348 of FIG. 3C) will fail on this second pass. The process will thus proceed to Line 06 of Algorithm 1 with w still having a value of 2. Because w is not null, the condition of Line 06 (step 354) will be satisfied, and the process will proceed to Line 07 (step 356) where fail(v) will be assigned the same value as goto(w, c). Again, because goto(2, "z") is 10, the fail link of node v will likewise point to the node with node_ID 10. The processing will therefore conclude with the node with node_ID 7 having a full-pop token of ["ab," "##c"] and a fail link pointing to the node with node_ID 10.

Figure 4:
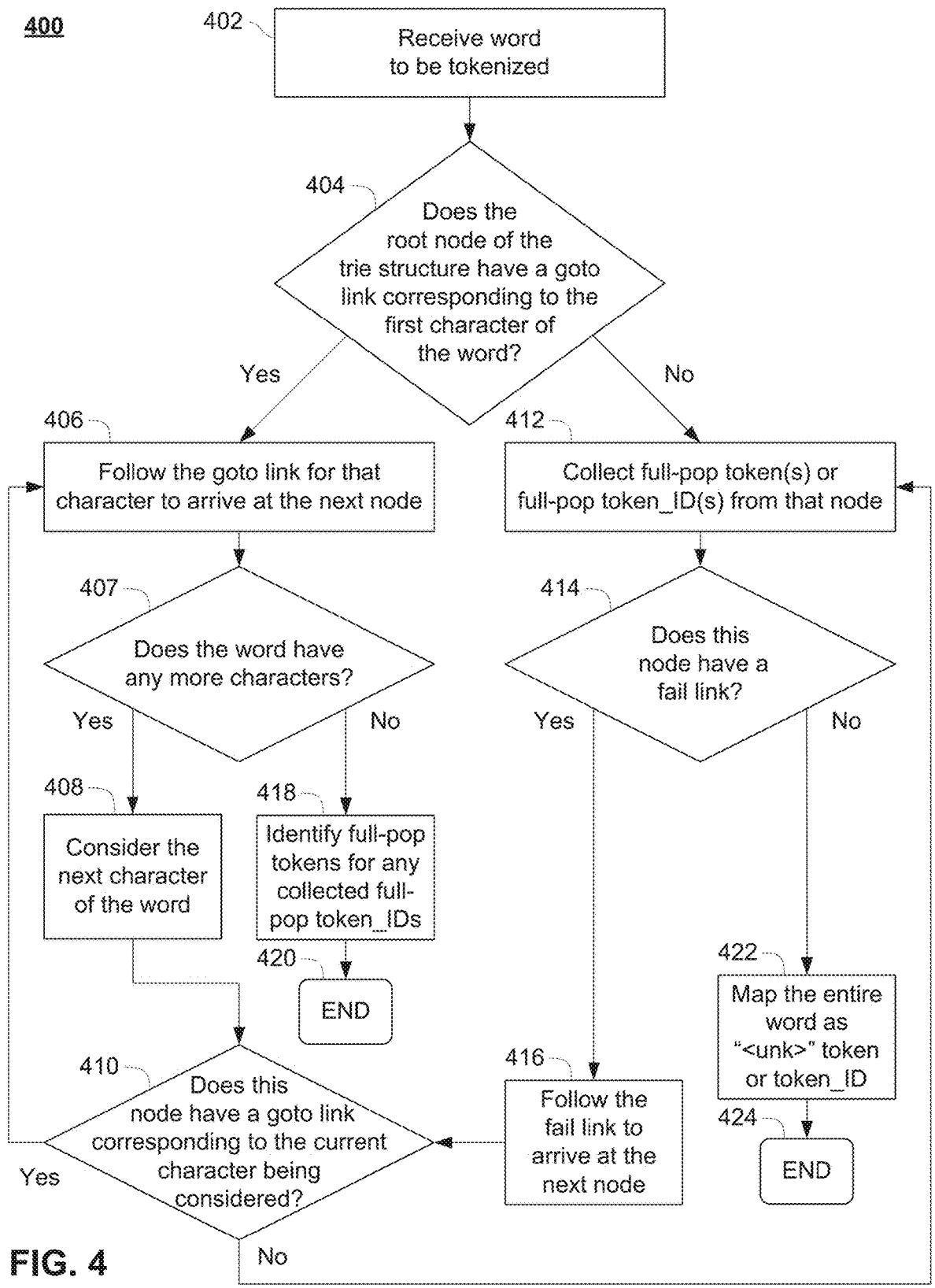
FIG. 4 is a flow diagram of an exemplary method of performing tokenization using a trie structure in accordance with aspects of the disclosure.

FIG. 4 is a flow diagram of an exemplary method in accordance with aspects of the disclosure. In that regard, FIG. 4 represents an exemplary process 400 that may be followed by tokenizer 114 to parse trie structures of the types shown in FIGS. 2A and 2B. Thus, in step 402, the tokenizer 114 will receive a word to be tokenized. Then, using the trie structure, the tokenizer 114 will determine whether the root node (e.g., in FIGS. 2A and 2B, the root node is the one with node_ID 0) has a goto link corresponding to the first character of the word. For example, if the word is "abcz$" as discussed above, the tokenizer 114 will determine whether the root node has a goto link corresponding to the letter "a."

If the root node does have a goto link corresponding to the first character of the word, then in step 406 the tokenizer 114 will follow the goto link to arrive at the next node. In step 407, the tokenizer 114 will then check to see whether the word has any more characters. If so, in step 408, the tokenizer 114 will then consider that next (second) character of the word. In step 410, the tokenizer 114 will determine whether the node in question has a goto link corresponding to this next (second) character of the word. If so, the tokenizer 114 will return to step 406 and follow the goto link corresponding to the second character to arrive at yet another node. The tokenizer 114 will then check whether the word has any further characters in step 407. If so, the tokenizer 114 will consider the next (third) character at step 408 and return to step 410 to determine if the node in question has a goto link corresponding to that third character of the word. This process will repeat for each next character and node until a node is reached that is found (at step 410) not to have a goto link corresponding to the character in question, or until it is found (at step 407) that there are no further characters in the word.

Whenever tokenizer 114 determines that there are no further characters to process (at step 407), the tokenizer 114 will proceed to step 418 where it will use the vocabulary to identify the full-pop tokens corresponding to any full-pop token_IDs that were collected (this step may be omitted for trie structures of the type shown in FIG. 2A), and then the process will end at step 420.

Whenever tokenizer 114 determines at step 410 that the node in question does not have a goto link corresponding to the current character under consideration, it will proceed to step 412 where it will collect the full-pop token(s) or full-pop token_ID(s) for that node. Then, at step 414, the tokenizer 114 will determine if the node in question has a fail link. If the node has no fail link (or its fail link is empty), it means that the word cannot be successfully tokenized. The tokenizer 114 will thus proceed to step 422 where it will map the entire word to a single token such as "<unk>" which indicates that the word is unknown, and then the process will end at step 424. However, if the node does have a fail link, then the tokenizer 114 will follow the fail link to arrive at the next node (as shown in step 416) and then return to step 410 to determine if that new node has a goto link corresponding to the current character being considered.

Similarly, if the root node is found at step 404 not to have a goto link corresponding to the first character of the word, then the tokenizer 114 will also proceed to step 412 where it will collect the full-pop token(s) or full-pop token_ID(s) from the root node (which is empty in the examples of FIGS. 2A and 2B). Then, in step 414, the tokenizer 114 will determine if the root node has a fail link. Here as well, if the root node has no fail link (or its fail link is empty), the tokenizer 114 will map the entire word to a single "unknown" token such as "<unk>" (step 422) and then the process will end (step 424). On the other hand, if the root node does have a fail link, then the tokenizer 114 will follow the fail link to arrive at the next node (as shown in step 416), and then proceed to step 410 to determine if that new node has a goto link corresponding to the first character of the word.

As a result of the parsing just described with respect to FIGS. 2A, 2B, and 4, the tokenizer 114 will identify only those full-pop tokens that represent the longest prefix, and each next longest suffix, of the sample text. Further, as each node has precomputed full-pop tokens or representative full-pop token_IDs, the trie structures of FIGS. 2A and 2B can be parsed in a single pass without needing to backtrack to a prior node to collect any full-pop tokens or full-pop token_IDs. As such, tokenizing the sample text "abcz$" only requires parsing the trie structure a single time, and following seven links (five goto links and two fail links) in order to identify wordpieces "ab," "##c," and "##z." However, for tree structures of the types shown in FIGS. 2A and 2B, precomputing full-pop tokens or full-pop token_IDs for every node leads to duplication that can impact both the time it takes to generate (or initialize) the trie structure 201a, and also the space needed to store it. Thus, in cases where a lower initialization time and/or a smaller trie structure 201a is desired, the examples of FIGS. 5A and 5B may be considered.

Figure 5A:
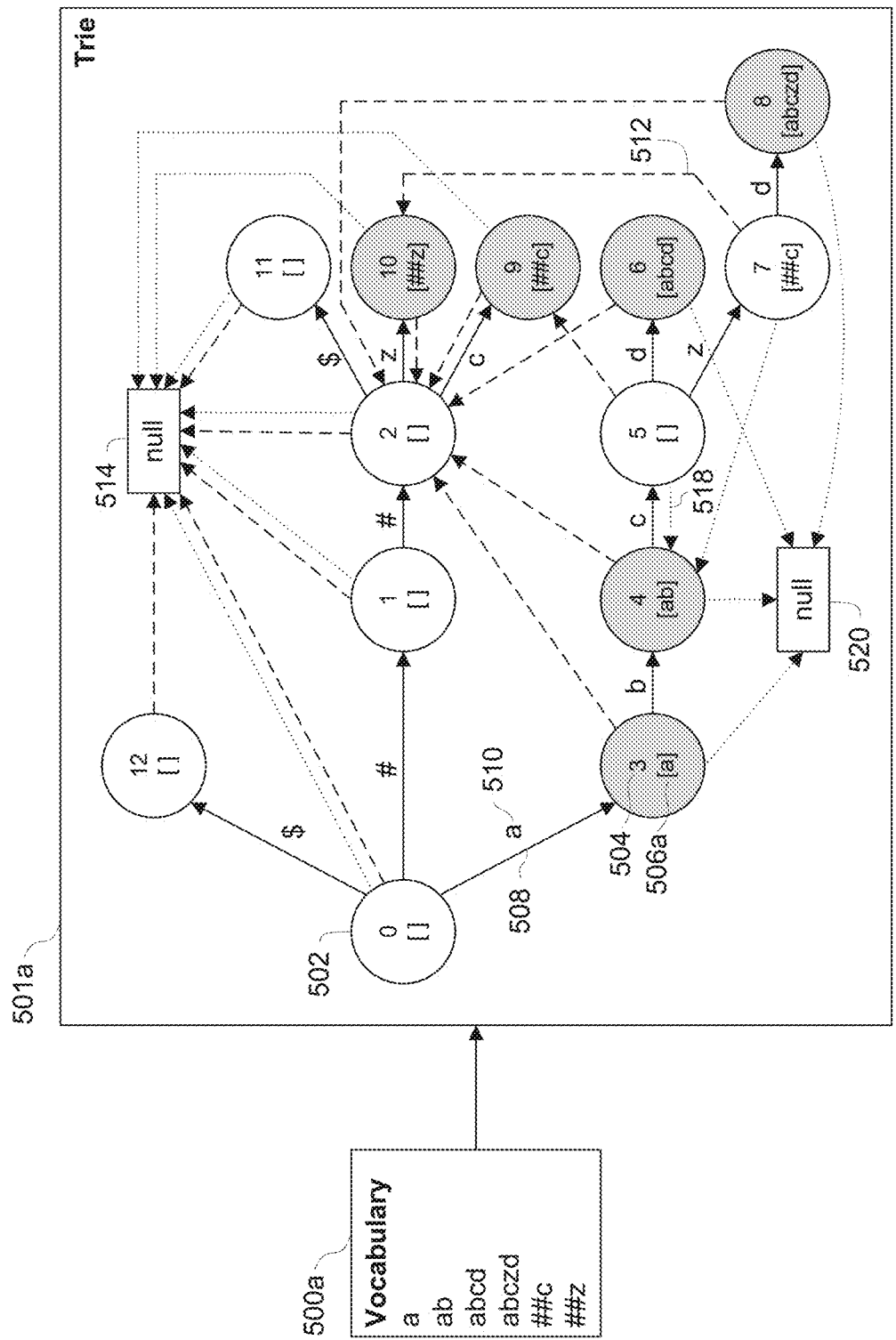
FIG. 5A depicts an exemplary vocabulary and corresponding trie structure in accordance with aspects of the disclosure.

FIG. 5A also depicts an exemplary vocabulary and corresponding trie structure in accordance with aspects of the technology. In the example of FIG. 5A, the vocabulary 500a has the same composition and content as the vocabulary 200a of FIG. 2A and thus contains the same six wordpieces: a; ab; abcd; abczd; ##c; and ##z. Likewise, in the example of FIG. 5A, vocabulary 200a is also converted into a trie structure 501a.

As with the prior examples, while trie structure 501a may be embodied as any data structure suitable for processing by tokenizer 114, it is shown pictorially in FIG. 5A for ease of explanation. In that regard, each of the circles in FIG. 5A (e.g., reference number 502) represents a node in trie structure 501a. Each circular node has within it a number at the top (e.g., reference number 504), which is a node_ID for that node. In addition, for each node that would have a different set of matching wordpieces than its preceding node, there will be a bracketed self-pop token at the bottom of the circle (e.g., reference number 506a). In that regard, where a node represents a string directly matching a wordpiece in vocabulary 500a, there will be no difference between the trie structures of FIGS. 2A and 5A, and the node will therefore have a self-pop token identical to the full-pop token shown in trie structure 201a (e.g., the nodes with node IDs 3, 4, 6, 8, 9, 10). Where a node's full-pop token in trie structure 201a is empty ("[ ]"), its self-pop token in trie structure 501a will also be empty ("[ ]") (e.g., the nodes with node IDs 0, 1, 2, 11, 12). Where a node's full-pop token in trie structure 201a would be the same as that of the preceding node, its self-pop token in trie structure 501a will be empty ("[ ]") (e.g., the node with node_ID 5), thus avoiding repetition of that string in the data structure. Finally, where a node's full-pop token in trie structure 201a would include the wordpiece(s) in the full-pop token of the preceding node, as well as an additional wordpiece, its self-pop token in trie structure 501a will list only the additional wordpiece (e.g., the node with node_ID 7).

As was the case with FIG. 2A, the solid arrows of FIG. 5A (e.g., reference number 508) of trie structure 501a represent goto links, and the characters next to each arrow (e.g., reference number 510) represent the condition for following that goto link. Likewise, the dashed arrows of FIG. 5A (e.g., reference number 512) of trie structure 501a represent fail links which operate the same way as has been described above with respect to FIG. 2A. However, in the examples of FIG. 5A, the trie structure 501a additionally includes dotted arrows (e.g., reference number 518) that represent prev_match links. For any node that represents a wordpiece in vocabulary 500a (e.g., the node with node_ID 4), the prev_match link will be empty, as that node already represents the longest match available in the vocabulary 500a. This empty prev_match link is shown pictorially in FIG. 5A by the prev_match arrow pointing back to a rectangular "null" box (e.g., those identified with reference numbers 514, 520). For any node whose full-pop token(s) in trie structure 201a would be the same as that of the preceding node, it will instead have a prev_match link pointing back to the earliest ancestor node with the same full-pop token(s). For example, because the node with node_ID 5 would otherwise need a full-pop token of "ab," it has a prev_match link 518 which points back to the node with node_ID 4, whose self-pop token is "ab." As already noted, this avoids repeating "ab" in node 5, and thus may reduce initialization time and the size of the trie structure. For any node whose full-pop tokens in trie structure 201a would include the wordpiece(s) in the full-pop token(s) of the preceding node, as well as one or more additional wordpieces, it will have a prev_match link pointing back to the earliest ancestor node with those shared wordpieces. For example, because the node with node_ID 7 would otherwise need full-pop tokens of ["ab," "##c"], it has a self-pop token listing the additional wordpiece ("##c") and a prev_match link which points back to the node with node_ID 4, whose self-pop token is "ab."

Thus, using the example trie structure 501a, assuming that the tokenizer 114 of processing system 102 is attempting to tokenize "abcz$," it will again begin at the root node with node_ID 0. Based on the first character of "abcz$" being "a," the tokenizer 114 will follow goto link 508 to arrive at the node with node_ID 3. Then, as the second character of "abcz$" is "b," the tokenizer 114 will follow the goto link for "b" to arrive at the node with node_ID 4. Likewise, as the third character of "abcz$" is "c," the tokenizer 114 will follow the goto link for "c" to arrive at the node with node_ID 5. Similarly, as the fourth character of "abcz$" is "z," the tokenizer 114 will follow the goto link for "z" to arrive at the node with node_ID 7.

However, as the fifth character of "abcz$" is not "d," the tokenizer 114 will not follow the next goto link to the node with node_ID 8. Rather, tokenizer 114 will instead collect the precomputed self-pop token ("##c") of the node at which it failed to move on (the node with node_ID 7), and will also recursively follow the chain of prev_match links extending from that node and collect the self-pop token(s) of each node in that chain until an empty prev_match link is encountered. Thus, as the node with node_ID 7 has a prev_match link pointing to the node with node_ID 4, the tokenizer 114 will collect the self-pop token of the node with node_ID 4 ("ab") of that node as well. Tokenizer 114 will then attempt to follow the prev_match link of the node with node_ID 4. However, because the prev_match link of the node with node_ID 4 is empty (shown in FIG. 5A as an arrow pointing to "null" box 520), there will be no further self-pop tokens to collect. The tokenizer 114 will then concatenate the collected self-pop tokens to generate an array of self-pop tokens (["ab," "##c"]), and will then follow fail link 512 to the node with node_ID 10. Because the tokenizer 114 only follows prev_match links and concatenates self-pop tokens when it cannot reach the next node using a goto link, the concatenated tokens automatically represent the longest segments of the sample text that match a known wordpiece in vocabulary 500a. Thus, in this example, the longest prefix within "abcz$" that is in vocabulary 500a is identified as "ab," and the longest suffix that immediately follows "ab" is identified as "##c."

Continuing with the same example, after following fail link 512 to the node with node_ID 10, the tokenizer 114 will attempt to follow the next goto link. However, as the node with node_ID 10 has no further goto links, the tokenizer 114 will be forced to again collect the self-pop token ("##z") of that node. In this case, as the node's prev_match link is empty (shown in FIG. 5A as an arrow pointing to "null" box 514), there will be no additional self-pop tokens to collect. Accordingly, the collected self-pop token of the node with node_ID 10 will then be concatenated with the previously collected self-pop tokens to generate an array of three self-pop tokens ("ab," "##c," "##z"). The tokenizer 114 will then follow the fail link to arrive at the node with node_ID 2.

Once at the node with node_ID 2, the tokenizer 114 will try to find a goto link for "$," the fifth character of "abcz$." As the trie structure 501a is configured with a goto link dedicated to the end-of-input character "$," the tokenizer 114 will follow that link to the node with node_ID 11. As there are no further characters to process in "abcz$," the tokenizer 114 will stop parsing trie structure 501a. The process will thus conclude with the existing array of three full-pop tokens ("ab," "##c," "##z").

Figure 5B:
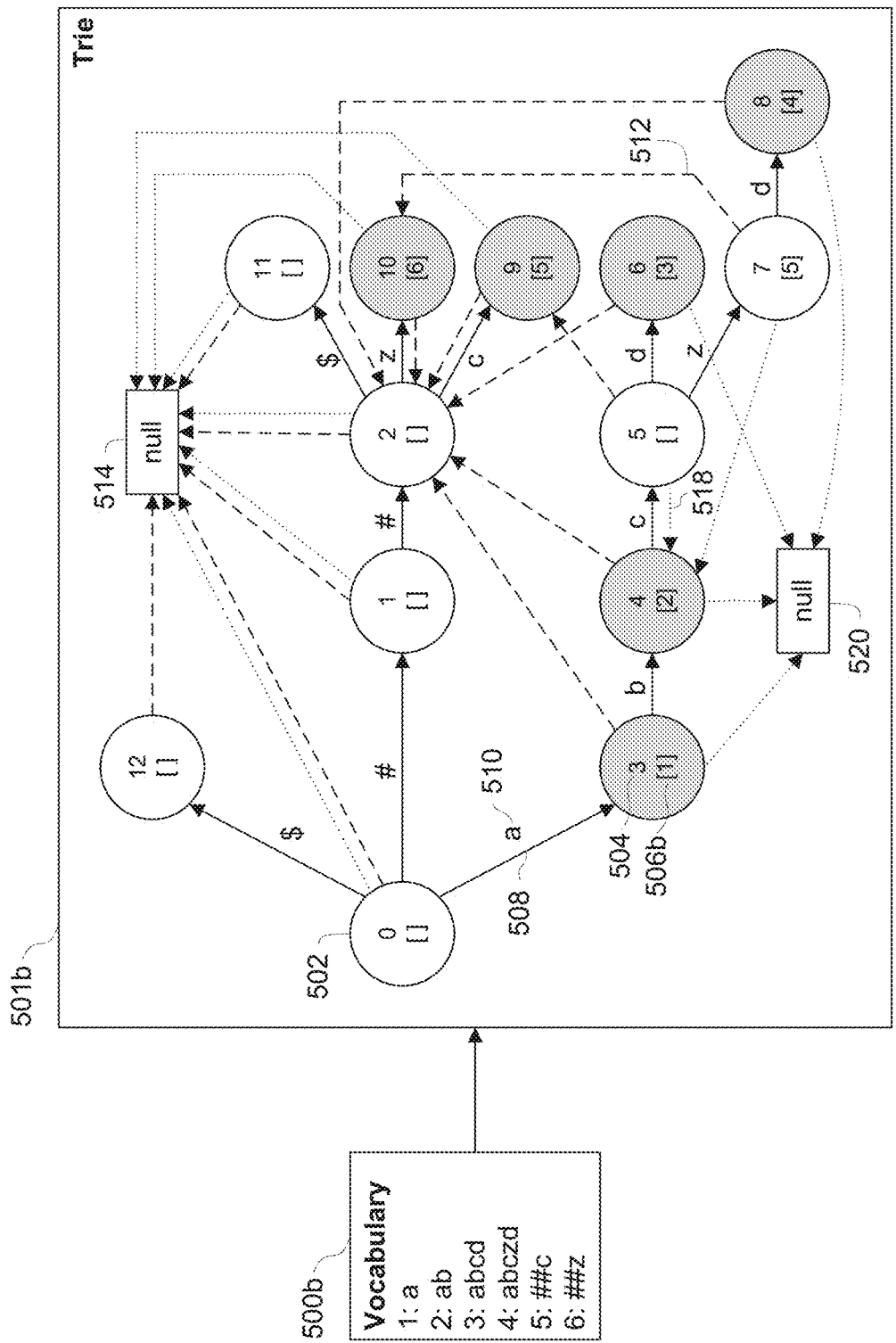
FIG. 5B depicts an exemplary vocabulary and corresponding trie structure in accordance with aspects of the disclosure.

FIG. 5B also depicts an exemplary vocabulary and corresponding trie structure in accordance with aspects of the technology. In the example of FIG. 5B, vocabulary 500b is the same as vocabulary 500a of FIG. 5A, except that each word in vocabulary 500b is further associated with a corresponding token_ID. For example, the first wordpiece "a" in vocabulary 200b is associated with token_ID "1." Likewise, FIG. 5B's trie structure 500b is the same as the trie structure 500a of FIG. 5A, and will be constructed the same way, except that trie structure 500b contains numerical self-pop token_IDs (e.g., reference number 206b) rather than the text of each self-pop token. In the example of FIG. 5B, the self-pop token_ID can be used in conjunction with vocabulary 500b to determine the text of the associated self-pop token. Other than the differences just described, the trie structures of FIGS. 5A and 5B are the same, and all reference numerals common between the two figures identify the same features. Thus, tokenizer 114 will parse trie structure 501b of FIG. 5B in the same manner as described above with respect to the trie structure 501a of FIG. 5A, but instead of collecting the text of each self-pop token, it will collect numerical self-pop token_IDs. Accordingly, in the example of FIG. 5B, after tokenizer 114 reaches the node with node_ID 11 and has no more characters to process, it will stop parsing the trie structure 501b and then use the collected self-pop token_IDs (2, 5, 6) to identify the corresponding tokens (ab, ##c, ##z).

Figure 6A:
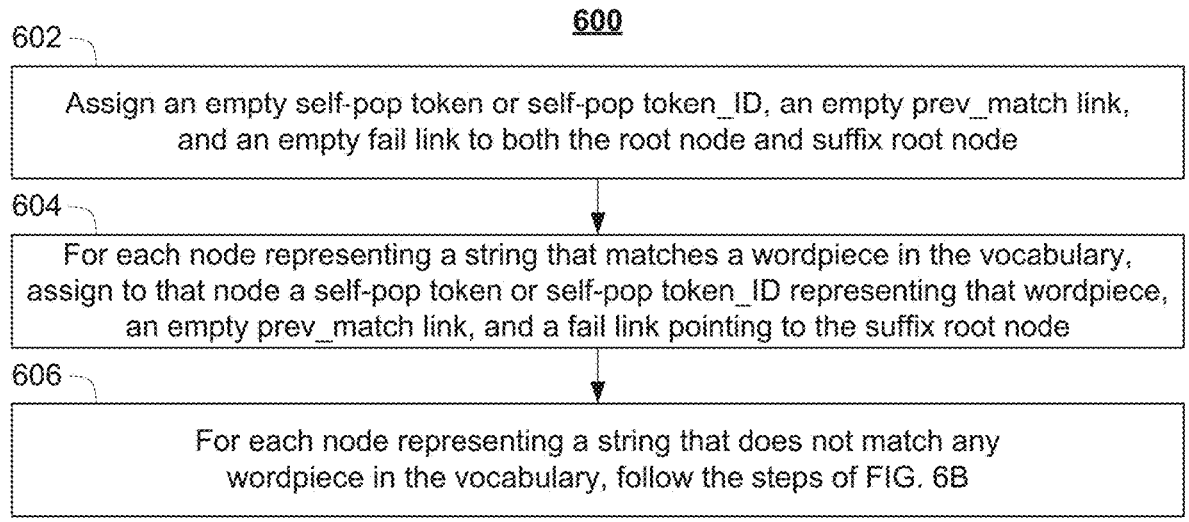
FIGS. 6A-6C are flow diagrams of an exemplary method of constructing a trie structure in accordance with aspects of the disclosure.
Figure 6B:
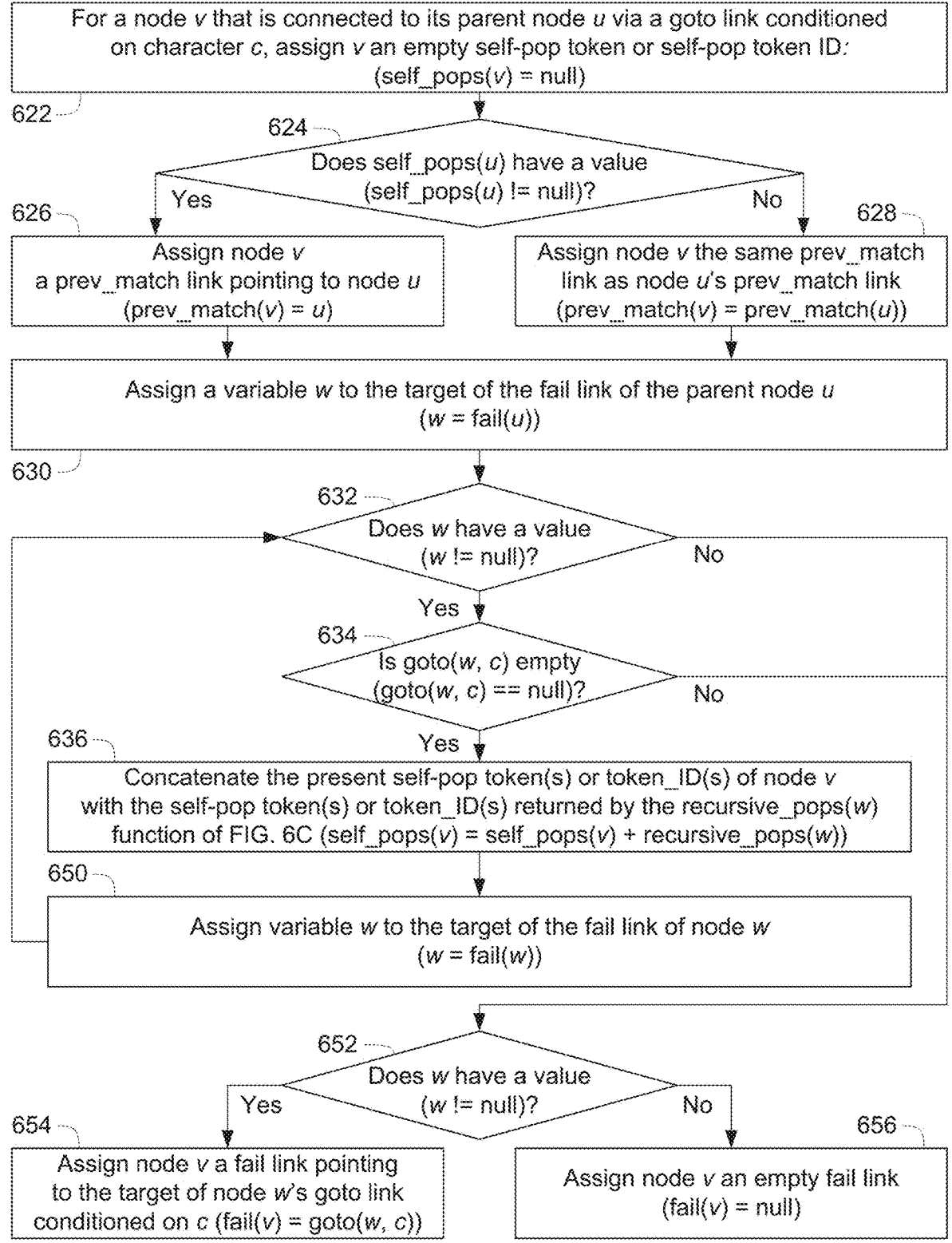
Figure 6C:
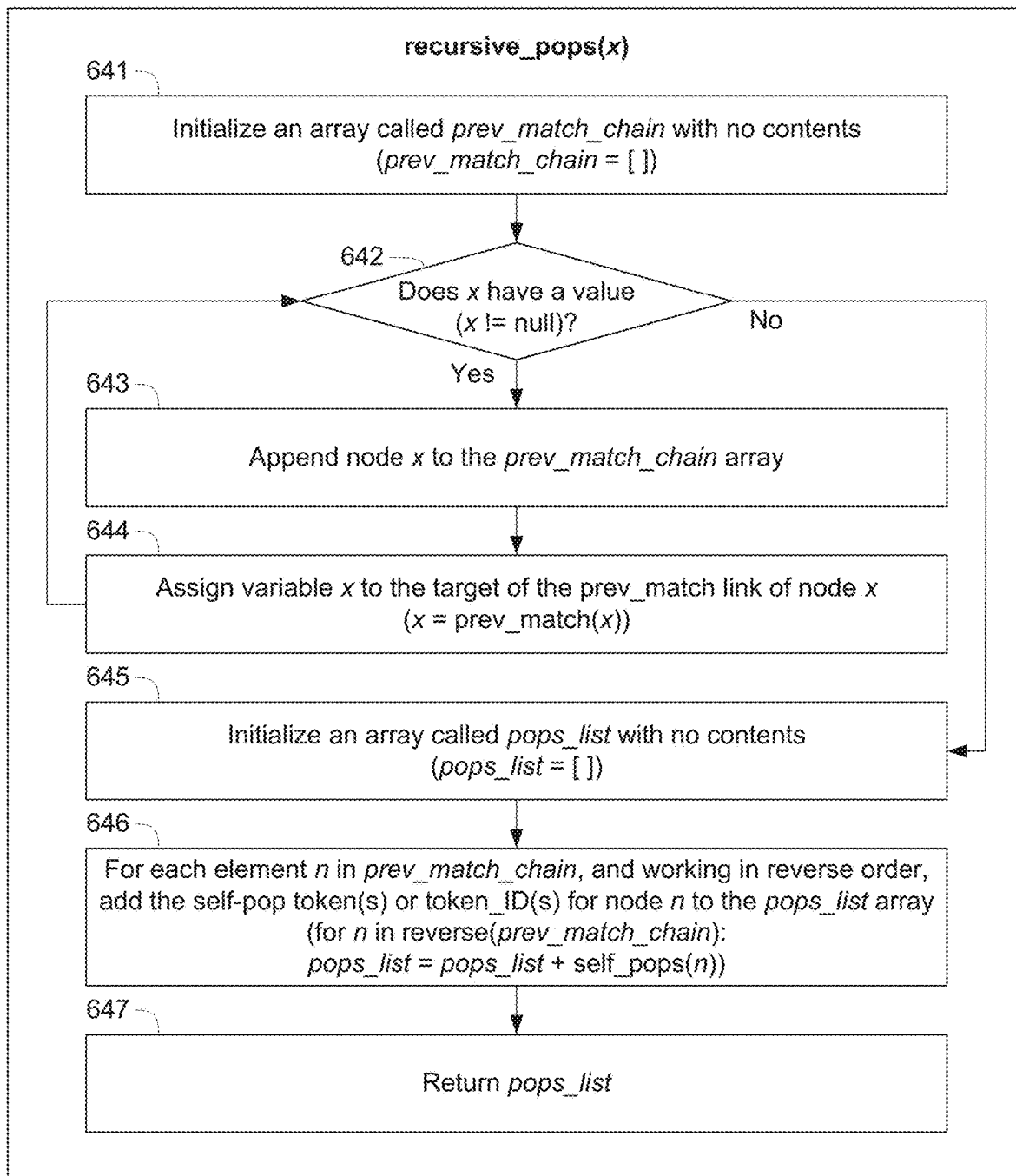

The nodes and goto links of the trie structures of FIGS. 5A and 5B can be created using the same process described above with respect to FIG. 3A. FIGS. 6A-6C are flow diagrams of an exemplary method of constructing the self-pop tokens or self-pop token_IDs, prev_match links, and fail links for a trie structure of the type shown in the examples of FIGS. 4A and 4B. In that regard, as shown in step 602 of FIG. 6A, both the root node (the node with node_ID 0) and the suffix root node (the node with node_ID 2) will be assigned self-pop tokens, prev_match links, and fail links that are empty (null).

In step 604, for each node representing a string that matches a wordpiece in the vocabulary, that node will be assigned a self-pop token or self-pop token_ID corresponding to the wordpiece it represents, a prev_match link that is empty (null), and a fail link that points to the suffix root node (the node with node_ID 2). Thus, in the example of FIG. 5A, because the vocabulary 500a includes a wordpiece "ab," the node for string "ab" (the node with node_ID 4) will get a self-pop token of "ab," an empty prev_match link (illustrated in FIG. 5A with a dotted arrow pointing to "null" box 520), and a fail link pointing to the node for "##" (the suffix root node with node_ID 2). Likewise, because the vocabulary 500a includes a suffix wordpiece "##c," the node for string "##c" (the node with node_ID 9) will get a self-pop token of "##c," an empty prev_match link (illustrated in FIG. 5A with a dotted arrow pointing to "null" box 514), and a fail link pointing back to the node for "##."

As shown in step 606, for any node representing a string that is not in the vocabulary, its self-pop token(s), prev_match link, and fail link will be computed according to method 620 of FIG. 6B (which incorporates method 640 of FIG. 6C). In that regard, FIG. 6B describes processing according to Algorithm 2 set forth below. In Algorithm 2 below, the node for which the self-pop token(s), prev_match link, and fail link are being computed is identified by v, its parent node is identified by u, and the goto link connecting u to v is conditioned on character c. In Algorithm 2, the function self_pops(x) returns the self-pop token(s) of the node with node_ID x. The function prev_match(x) returns the returns the node_ID of the target of the prev_match link for the node with node_ID x. Thus, in the example of FIG. 5A, prev_match(5) would return 4, because the node with node_ID 5 has a prev_match link pointing to the node with node_ID 4. The operation x.APPEND(y) appends an array (or list) x with y. For example, if x is the list [0, 1, 2] and y has a value of 5, then x.APPEND(y) would return the list [0, 1, 2, 5]. The operation REVERSE(x) reverses the elements of an array x. For example, if x is the list [0, 1, 2], then REVERSE(x) would change x to being the list [2, 1, 0]. The operation FOR n IN x: performs whatever operations follow the colon for each successive element n in list x. Where a first function calls a second function, the operation RETURN x in the second function will cause x to be passed back to the first function. The functions fail(x) and goto(x, c) operate in the same way described above with respect to Algorithm 1. Likewise, the symbols "!=" and "==" and "=" and "+" denote the same operations described above with respect to Algorithm 1. Finally, as above, the WHILE, IF, ELSE, and operations all function as commonly understood in the art of computer programming.

Algorithm 2:

| Line 01: | self_pops(v) = null |
| Line 02: | IF self_pops(u) != null: |
| Line 03: | prev_match(v) = u |
| Line 04: | ELSE: |
| Line 05: | prev_match(v) = prev_match(u) |
| Line 06: | w = fail(u) |
| Line 07: | WHILE w != null AND goto(w, c) == null: |
| Line 08: | self_pops(v) = self_pops(v) + recursive_pops(w) |
| Line 09: | w = fail(w) |
| Line 10: | IF w != null: |
| Line 11: | fail(v) = goto(w, c) |
| Line 12: | ELSE: |
| Line 13: | fail(v) = 0 |

Function recursive_pops(x):

| Line 14: | prev_match_chain = [ ] |
| Line 15: | WHILE x != null: |
| Line 16: | prev_match_chain.APPEND(x) |
| Line 17: | x = prev_match(x) |
| Line 18: | pops_list = [ ] |
| Line 19: | FOR n IN REVERSE(prev_match_chain): |
| Line 20: | pops_list = pops_list + self_pops(n) |
| Line 21: | RETURN pops_list |

Thus, according to Line 01 of Algorithm 2 above, any node v representing a string that is not in the vocabulary will initially be assigned an empty self-pop token. This operation is represented by step 622 of FIG. 6B.

Next, according to Lines 02 and 03 of Algorithm 2, if parent node u's self-pop token is not empty, then node v will be assigned a prev_match link pointing to parent node u. This condition and result is represented in FIG. 6B by the "yes" arrow connecting step 624 to step 626. Thus, in the example of FIG. 5A, if v is node_ID 5, u is node_ID 4, and c is character "c," then prev_match(v) will be assigned a value of 4 because the node with node_ID 4 has a self-pop token of "ab."

On the other hand, according to Lines 02, 04, and 05 of Algorithm 2, if parent node u has an empty self-pop token, then node v will be assigned a prev_match link pointing to the target of node u's prev_match link. This condition and result is represented in FIG. 6B by the "no" arrow connecting step 624 to step 628.

Next, according to Line 06 of Algorithm 2, a variable w will initially be assigned the same value as the fail link of parent node u. This operation is represented by step 630 of FIG. 6B. Thus, continuing with the same example based on FIG. 5A in which v is node_ID 5, u is node_ID 4, and c is character "c," then variable w will initially be assigned a value of "2" because parent node u (the node with node_ID 4) has a fail link pointing to the node with node_ID 2.

According to Lines 07-09 of Algorithm 2, a while loop will begin, each loop of which is conditioned on variable w not being null, and on node w having no goto link conditioned on character c. These two initial conditions are represented in steps 632 and 634, respectively, of FIG. 6B. Based on the initial value of w being 2, the first condition of Line 07 (and step 632) will be satisfied. However, based on c being character "c," the function goto(2, "c") will return a value of 9 because the node with node_ID 2 has a goto link conditioned on "c" that points to the node with node_ID 9, thus failing to satisfy the second condition of Line 07 (and step 634). Thus, in the present example, the process will skip Line 08 and Line 09, and proceed to Line 10. This is represented in FIG. 6B by the "no" arrow connecting step 634 to step 652.

According to Lines 10 and 11 of Algorithm 2, if w is not null, then fail(v) will be assigned the same value as goto(w, c). This condition and result is represented in FIG. 6B by the "yes" arrow connecting step 652 to step 654. Thus, in the present example, because w still has a value of "2," and because the node with node_ID 2 has a goto link conditioned on character "c" that points to the node with node_ID 0, the fail link for node v will be assigned a value of 9 so that it also points to the node with node_ID 9. The processing will therefore conclude with the node with node_ID 5 keeping its initially assigned empty self-pop token, and being assigned a prev_match link pointing back to its parent node with node_ID 4, and a fail link pointing to the node with node_ID 9.

On the other hand, according to Lines 10, 12, and 13 of Algorithm 2, if w were instead null, then fail(v) would be assigned a null value as well (given an empty fail link). This condition and result is represented in FIG. 6B by the "no" arrow connecting step 652 to step 656.

After the process just described has been completed, it may be repeated for each next node, making use of the self-pop token(s), prev_match link, and fail link computed for each prior node. Thus, after the process concludes in the example just described, u may become node_ID 5 and v may become node_ID 7, making c become character "z." With these new parameters, according to Line 01 of Algorithm 2 (and step 622), self_pops(v) will initially be assigned an empty self-pop token.

Next, according to Line 02 of Algorithm 2 (and step 624), the condition will not be satisfied because parent node u (the node with node_ID 5) has an empty self-pop token (as computed in the prior round of processing, described above). The process will thus skip Line 03 of Algorithm 2, and instead advance (via Line 04) to Line 05 (step 628). According to Line 05, because the node u has a prev_match link pointing to the node with node_ID 4, prev_match(v) will also be assigned a value of 4.

Continuing with the same example, according to Line 06 of Algorithm 2 (and step 630), variable w will initially be assigned a value of "9" because the fail link for node u (computed in the prior round of processing, described above) points to the node with node_ID 9. Then, based on these values of w and c, w will not be null, and goto(w, c) will initially be null because the node with node_ID 9 has no goto links conditioned on character "z." As such, both conditions in Line 07 of Algorithm 2 will be satisfied, and the while loop will proceed to Line 08. This set of conditions and results are represented in FIG. 6B by the "yes" arrow connecting step 632 to step 634, and the "yes" arrow connecting step 634 to step 636.

According to Line 08 of Algorithm 2, the initial value of self_pops(v) will be incremented by the value returned by the recursive_pops(w) function. This operation is represented by step 636 of FIG. 6B. The recursive_pops(x) function is defined in Lines 14-21 of Algorithm 2 and FIG. 6C. When the recursive_pops function is called, it will begin according to Line 14 by initializing an array named prev_match_chain with no contents. This operation is represented by step 641 of FIG. 6C. Next, according to Lines 15-17 of Algorithm 2, a while loop will begin. According to Line 15 of Algorithm 2, each loop of the while loop is conditioned on variable x not being null. This condition is represented by step 642 of FIG. 6C.

In that regard, if the value x which has been passed to the recursive_pops function is not null, then, according to Line 16 of Algorithm 2, that value will be appended to the prev_match_chain array. This condition and result is represented in FIG. 6C by the "yes" arrow connecting step 642 to step 643. Thus, in the present example, because w is passed into the recursive_pops function, and because w has a value of 9, variable x will have a value of 9 on this first pass and the condition of Line 15 will be satisfied. As a result, that value of 9 will be appended to the prev_match_chain array, making it a single-entry list of [9]. Then, according to Line 17 of Algorithm 2, x is assigned a new value corresponding to the target of its own prev_match link. This operation is represented by step 644 of FIG. 6C. In the present example, because the node with node_ID 9 has a prev_match link that is null (set according to step 604), x will be reassigned a null value in Line 17 of Algorithm 2. The process will then return to Line 15. This is represented by the arrow connecting step 644 back to step 642 in FIG. 6C. However, on this second pass, as x is now null, the condition of Line 15 will not be satisfied, and the process will proceed to Line 18 of Algorithm 2. This condition and result is represented in FIG. 6C by the "no" arrow connecting step 642 to step 645.

According to Line 18 of Algorithm 2, a new array named pops list will be initialized with no contents. This operation is represented by step 645 of FIG. 6C. Then, according to Lines 19 and 20 of Algorithm 2, a FOR loop will be initiated in which the prev_match_chain array will be reversed, and the self-pop token(s) of each element n of that reversed list will be successively collected and added to the pops list array. This operation is represented by step 646 of FIG. 6C. In the present example, because prev_match_chain is a single-entry list of [9], and because the node with node_ID has a self-pop token of "##c," the for loop will conclude with pops list being set to a single-entry list ["##c"].

According to Line 21 of Algorithm 2, once the FOR loop has completed, the contents of pops list will be returned as the response to recursive_pops(w) in Line 08 of Algorithm 2. This operation is represented by step 647 of FIG. 6C, and the resulting values will be used to complete the operation represented by step 636 of FIG. 6B. Thus, in the present example, because self_pops(v) was set to be null in Line 01 of Algorithm 2 (and step 622 of FIG. 6B), Line 08 (and step 636 of FIG. 6B) will result in self_pops(v) being set to ["##c"].

Then, in Line 09 of Algorithm 2, w is assigned a new value corresponding to the target of the fail link of the node with node_ID w. This operation is represented by step 650 of FIG. 6B. Thus, in the present example, because w has a value of 9, and because the node with node_ID 9 has a fail link that points to the node with node_ID 2, w is reassigned a value of 2 in Line 09. The process will then return to Line 07 with w having a new value of 2. This is represented by the arrow connecting step 650 back to step 632 in FIG. 6B.

However, on this second pass, goto(2, "z") will return a value of 10 because the node with node_ID 2 has a goto link conditioned on character "z" which points to the node with node_ID 10. Thus, goto(w, c) will not be null, and the conditions for the while loop (Line 07 of Algorithm 2; step 634 of FIG. 6B) will fail on this second pass. The process will thus proceed to Line 10 of Algorithm 2 with w still having a value of 2. Because w is not null, the condition of Line 10 (step 652) will be satisfied, and the process will proceed to Line 11 (step 654) where fail(v) will be assigned the same value as goto(w, c). Again, because goto(2, "z") is 10, the fail link of node v will likewise point to the node with node_ID 10. The processing will therefore conclude with the node with node_ID 7 being assigned a self-pop token of "##c," a prev_match link pointing back to the node with node_ID 4, and a fail link pointing to the node with node_ID 10.

Figure 7:
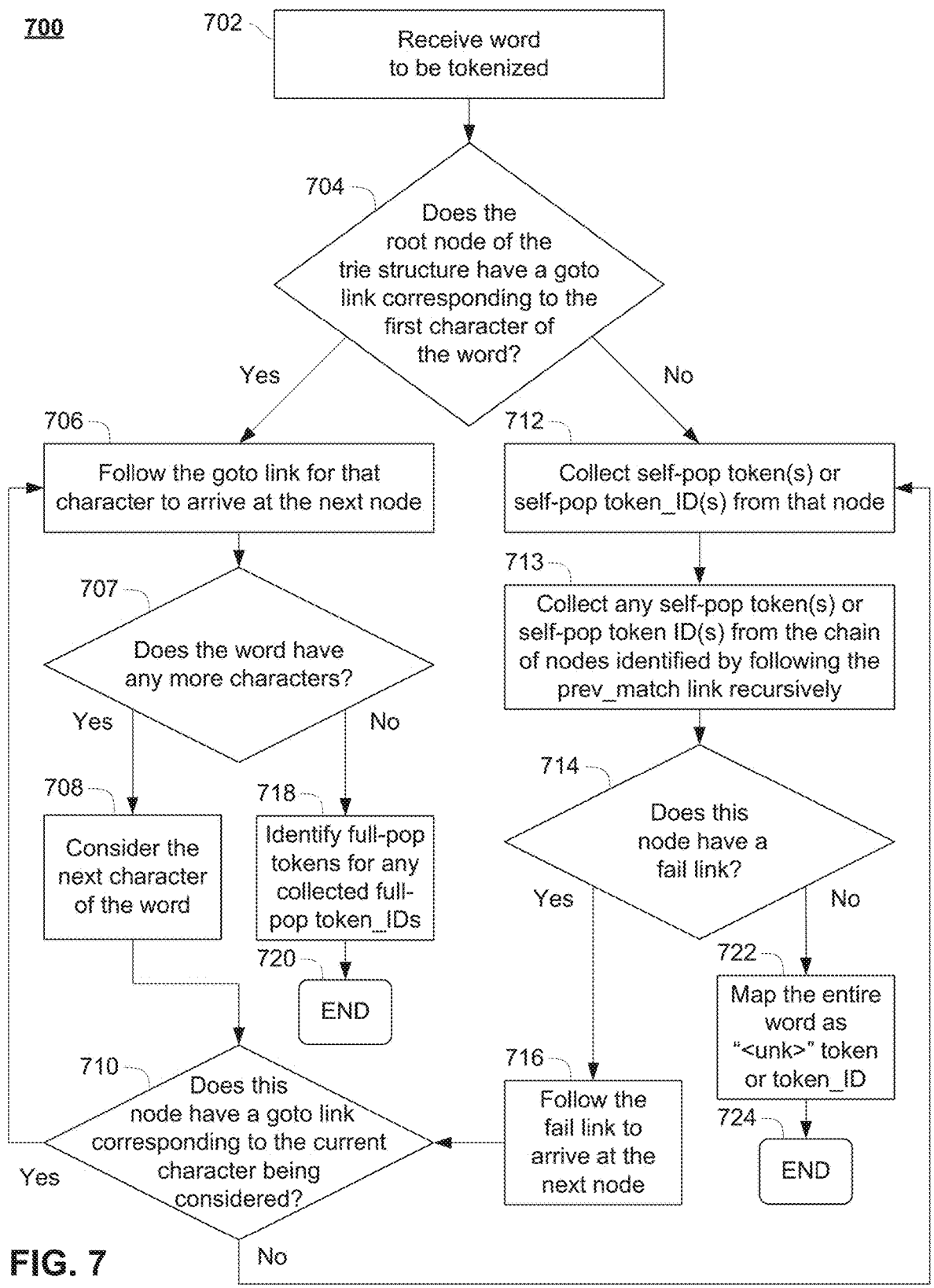
FIG. 7 is a flow diagram of an exemplary method of performing tokenization using a trie structure in accordance with aspects of the disclosure.

FIG. 7 is a flow diagram of an exemplary method in accordance with aspects of the disclosure. In that regard, FIG. 7 represents an exemplary process 700 that may be followed by tokenizer 114 to parse trie structures of the types shown in FIGS. 5A and 5B. Thus, in step 702, the tokenizer 114 will receive a word to be tokenized. Then, using the trie structure, the tokenizer 114 will determine whether the root node (e.g., in FIGS. 5A and 5B, the root node is the one with node_ID 0) has a goto link corresponding to the first character of the word. For example, if the word is "abcz$" as discussed above, the tokenizer 114 will determine whether the root node has a goto link corresponding to the letter "a."

If the root node does have a goto link corresponding to the first character of the word, then in step 706 the tokenizer 114 will follow the goto link to arrive at the next node. In step 707, the tokenizer 114 will then check to see whether the word has any more characters. If so, in step 708, the tokenizer 114 will then consider the next (second) character of the word. In step 710, the tokenizer 114 will determine whether the node in question has a goto link corresponding to this next (second) character of the word. If so, the tokenizer 114 will return to step 706 and follow the goto link corresponding to the second character to arrive at yet another node. The tokenizer 114 will then check whether the word has any further characters in step 707. If so, the tokenizer 114 will consider the next (third) character at step 708 and return to step 710 to determine if the node in question has a goto link corresponding to that third character of the word. This process will repeat for each next character and node until a node is reached that is found (at step 710) not to have a goto link corresponding to the character in question, or until it is found (at step 707) that there are no further characters in the word.

Whenever tokenizer 114 determines that there are no further characters to process (at step 707), the tokenizer 114 will proceed to step 718 where it will use the vocabulary to identify the full-pop tokens corresponding to any full-pop token_IDs that were collected (this step may be omitted for trie structures of the type shown in FIG. 5A), and then the process will end at step 720.

Whenever tokenizer 114 determines at step 710 that the node in question does not have a goto link corresponding to the current character under consideration, it will proceed to step 712 where it will collect the self-pop token(s) or self-pop token_ID(s) for that node. Then, at step 713, the tokenizer 114 will also recursively follow the chain of prev_match links extending from that node and collect the self-pop token(s) or self-pop token_ID(s) of each node in that chain until an empty prev_match link is encountered. As discussed above, the self-pop token(s) or self-pop token_ID (s) collected in steps 712 and 713 will be concatenated.

At step 714, the tokenizer 114 will determine if the node in question has a fail link. If the node has no fail link (or its fail link is empty), it means that the word cannot be successfully tokenized. The tokenizer 114 will thus proceed to step 722 where it will map the entire word to a single token such as "<unk>" which indicates that the word is unknown, and then the process will end at step 724. However, if the node does have a fail link, then the tokenizer 114 will follow the fail link to arrive at the next node (as shown in step 716) and then return to step 710 to determine if that new node has a goto link corresponding to the current character being considered.

Similarly, if the root node is found at step 704 not to have a goto link corresponding to the first character of the word, then the tokenizer 114 will also proceed to step 712 where it will collect the self-pop token(s) or self-pop token_ID(s) from the root node (which is empty in the examples of FIGS. 5A and 5B). Then, in step 714, the tokenizer 114 will determine if the root node has a fail link. Here as well, if the root node has no fail link (or its fail link is empty), the tokenizer 114 will map the entire word to a single "unknown" token such as "<unk>" (step 722) and then the process will end (step 724). On the other hand, if the root node does have a fail link, then the tokenizer 114 will follow the fail link to arrive at the next node (as shown in step 716), and then proceed to step 710 to determine if that new node has a goto link corresponding to the first character of the word.

As a result of the parsing just described with respect to FIGS. 5A, 5B, and 7, the tokenizer 114 will identify only those self-pop tokens that represent the longest prefix, and each next longest suffix, of the sample text. Further, by virtue of the precomputed prev_match link, and the precomputed self-pop tokens or representative self-pop token_IDs, the trie structures of FIGS. 5A and 5B can still be parsed in a single pass, but do not require duplication of full-pop tokens or full-pop token_IDs as in the trie structures of FIGS. 2A and 2B. Thus, tokenizing the sample text "abcz$" only requires parsing the trie structure a single time, and following eight links (five goto links, two fail links, and one prev_match link) in order to identify wordpieces "ab," "##c," and "##z."

Although the examples described above with respect to FIGS. 2-7 operate on a left-to-right longest-match-first greedy process (or "Forward MaxMatch" process), the same procedures can be adapted to a right-to-left longest-match-first greedy process (or "Reverse MaxMatch" process) by reversing all strings in the vocabulary, and constructing a corresponding trie structure.

Likewise, although the examples described above with respect to FIGS. 2-7 identify wordpieces corresponding to every character of a given word, in some aspects of the technology, the tokenizer may be configured to skip over characters that are unknown, or not found in the vocabulary, and continue processing. For example, the tokenizer 114 may be configured to insert a placeholder "<unk>" token for any unrecognized character into the fullpops list, and then continue processing the next character as has already been described. Thus, using the vocabulary of the example of Table 1 above, if the character "~" is unknown, the tokenizer 114 may be configured to map the word "un~knowable" to [un, <unk>, ##know, ##able].

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method comprising:
performing, by one or more processors of a processing system, tokenization of a string of text, comprising:
analyzing a set of nodes of a vocabulary trie structure to identify one or more links between nodes of the vocabulary trie structure corresponding to one or more characters of the string;
identifying a fail link between a pair of nodes in the set of nodes;
storing, based on the fail link, a first token representing a word or wordpiece comprised of a pair of characters of the string;
storing a second token representing a word or wordpiece comprised of another character of the string; and
concatenating the first token and the second token to form an array of tokens; and
providing, by the one or more processors, the array of tokens to a neural network for natural language processing.

2. The method of claim 1, wherein identifying the fail link between the pair of nodes in the set of nodes includes analyzing one of the pair of nodes to determine whether that node has no link corresponding to a given character of the string.

3. The method of claim 1, wherein the first token comprises a word or wordpiece including a first character and a second character of the string.

4. The method of claim 3, wherein the second token includes a third character of the string.

5. The method of claim 1, wherein the first token identifies an entry in a vocabulary for a word or wordpiece including a first character and a second character of the string.

6. The method of claim 5, wherein the second token identifies an entry in the vocabulary for a third character of the string.

7. The method of claim 1, wherein the string further comprises a given character that is a symbol representing the end of the string.

8. The method of claim 1, further comprising performing the natural language processing on a segment of text using the neural network.

9. The method of claim 1, further comprising using the fail link to arrive at a next node of the vocabulary trie structure.

10. A processing system comprising:
a memory; and
one or more processors coupled to the memory and configured to:
perform tokenization of a string of text, comprising:
analyze a set of nodes of a vocabulary trie structure to identify one or more links between nodes of the vocabulary trie structure corresponding to one or more characters of the string;

identify a fail link between a pair of nodes in the set of nodes;

store in the memory, based on the fail link, a first token representing a word or wordpiece comprised of a pair of characters of the string;

store in the memory a second token representing a word or wordpiece comprised of another character of the string; and concatenate the first token and the second token to form an array of tokens; and provide the array of tokens to a neural network for natural language processing.

11. The system of claim 10, wherein identification of the fail link between the pair of nodes in the set of nodes includes analysis of one of the pair of nodes to determine whether that node has no link corresponding to a given character of the string.

12. The system of claim 10, wherein the first token comprises a word or wordpiece including a first character and a second character of the string.

13. The system of claim 12, wherein the second token includes a third character of the string.

14. The system of claim 10, wherein the first token identifies an entry in a vocabulary for a word or wordpiece including a first character and a second character of the string.

15. The system of claim 14, wherein the second token identifies an entry in the vocabulary for a third character of the string.

16. The system of claim 10, wherein the string further comprises a given character that is a symbol representing the end of the string.

17. The system of claim 10, wherein the one or more processors are further configured to perform the natural language processing on a segment of text via the neural network.

18. The system of claim 10, wherein the one or more processors are further configured to us the fail link to arrive at a next node of the vocabulary trie structure.

19. A non-transitory recording medium having computer-readable instructions stored thereon, the instructions, when executed by one or more processors of a processing system:

performing tokenization of a string of text, comprising:

analyzing a set of nodes of a vocabulary trie structure to identify one or more links between nodes of the vocabulary trie structure corresponding to one or more characters of the string;

identifying a fail link between a pair of nodes in the set of nodes;

storing, based on the fail link, a first token representing a word or wordpiece comprised of a pair of characters of the string;

storing a second token representing a word or wordpiece comprised of another character of the string; and concatenating the first token and the second token to form an array of tokens; and providing the array of tokens to a neural network for natural language processing.

20. The recording medium of claim 19, wherein identifying the fail link between the pair of nodes in the set of nodes includes analyzing one of the pair of nodes to determine whether that node has no link corresponding to a given character of the string.

\* \* \* \* \*